United States Patent

Ikeda

[11] Patent Number: 5,835,971
[45] Date of Patent: *Nov. 10, 1998

[54] METHOD AND APPARATUS FOR GENERATING ADDRESSES IN PARALLEL PROCESSING SYSTEMS

[75] Inventor: Masayuki Ikeda, Kanagawa, Japan

[73] Assignee: Fujitsu Limited, Kawasaki-ku, Japan

[*] Notice: This patent issued on a continued prosecution application filed under 37 CFR 1.53(d), and is subject to the twenty year patent term provisions of 35 U.S.C. 154(a)(2).

[21] Appl. No.: 567,232

[22] Filed: Dec. 5, 1995

[30] Foreign Application Priority Data

Dec. 6, 1994 [JP] Japan .................................. 6-301961

[51] Int. Cl.$^6$ .................................................. G06F 12/06
[52] U.S. Cl. ......................... 711/220; 711/214; 711/215; 711/217; 711/218; 711/219
[58] Field of Search ........................... 395/421.1, 421.07, 395/410, 421.05, 421.09, 421.08, 800, 275; 711/215, 214, 217, 218, 219, 220

[56] References Cited

U.S. PATENT DOCUMENTS 4,939,642  7/1990  Blank ..................................... 395/800
5,388,220  2/1995  Okabayashi ............................. 395/275
5,408,613  4/1995  Okabayashi ........................ 395/200.01
5,418,970  5/1995  Gifford .................................... 395/800

*Primary Examiner*—Eddie P. Chan
*Assistant Examiner*—Than V. Nguyen
*Attorney, Agent, or Firm*—Armstrong, Westerman, Hattori, McLeland & Naughton

[57] ABSTRACT

An apparatus for generating an address to increase efficiency in parallel processing in a multiprocessor system. A global address generating unit is provided within a vector unit of each of processing elements (PE) constituting a parallel computer system. An adder provided within the global address generating unit sequentially adds an increment of an address, d_Adr_exl, and d_Adr_in to an address Adr_exl and Adr_in, respectively. A subtracter outputs a quotient obtained by dividing d_Adr_exl by band width bexl as a logical PE number. Additionally, a remainder obtained as an output from a subtracter is added to Adr_in, thereby enabling a logical in-PE address to be obtained. The logical PE number and the logical in-PE address thus obtained are converted to a real PE number and a real in-PE address. Generating a global address by hardware reduces overhead incurred by parallel operation of array data.

16 Claims, 16 Drawing Sheets

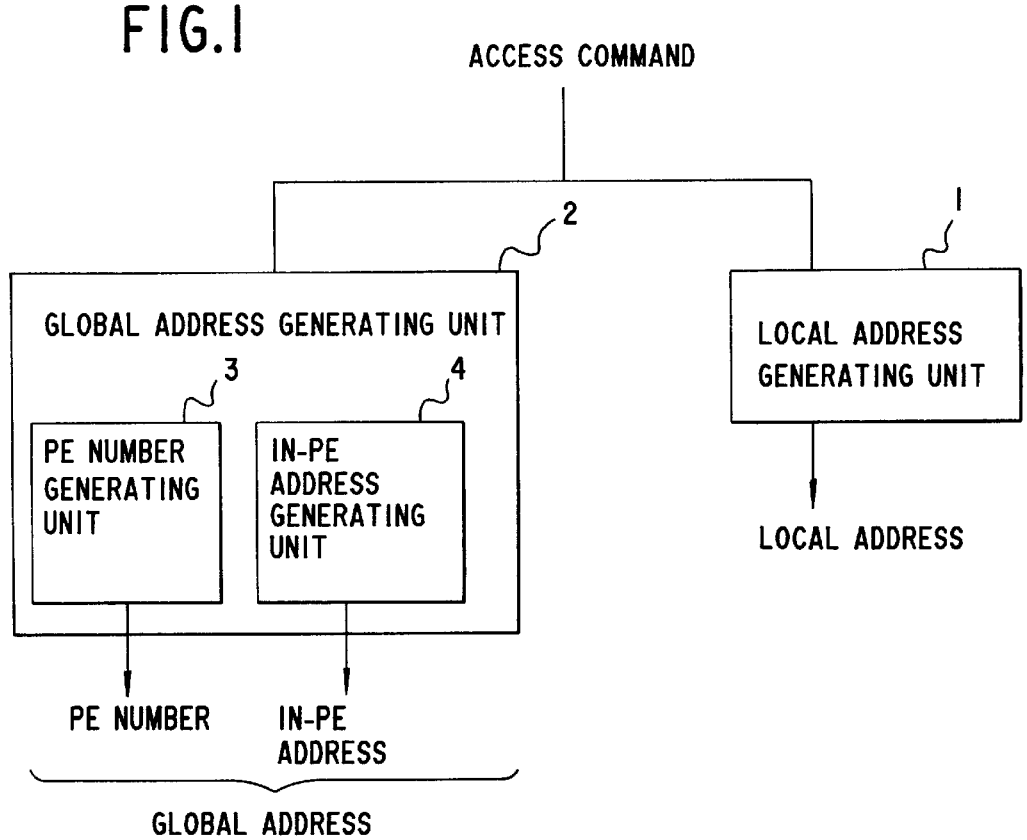
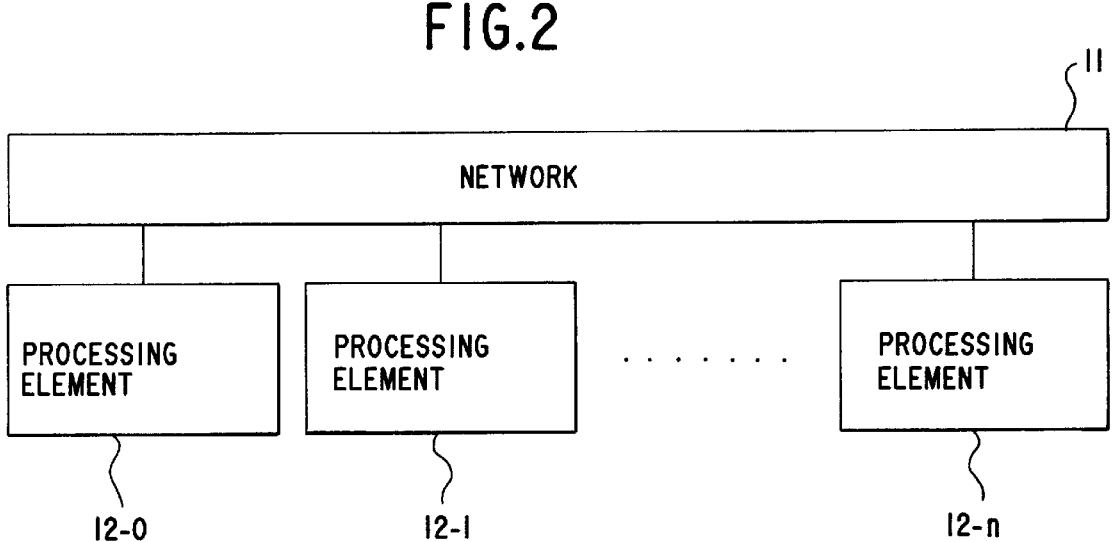

FIG.7

| pe0 | pe1 | pe2 | pe3 |
|---|---|---|---|
| (1, 1, 1)<br>(2, 1, 1)<br>(3, 1, 1)<br>(4, 1, 1)<br>(5, 1, 1) | (1, 4, 1)<br>(2, 4, 1)<br>(3, 4, 1)<br>(4, 4, 1)<br>(5, 4, 1) | (1, 7, 1)<br>(2, 7, 1)<br>(3, 7, 1)<br>(4, 7, 1)<br>(5, 7, 1) | (1, 10, 1)<br>(2, 10, 1)<br>(3, 10, 1)<br>(4, 10, 1)<br>(5, 10, 1) |
| (1, 2, 1)<br>(2, 2, 1)<br>(3, 2, 1)<br>(4, 2, 1)<br>(5, 2, 1) | (1, 5, 1)<br>(2, 5, 1)<br>(3, 5, 1)<br>(4, 5, 1)<br>(5, 5, 1) | (1, 8, 1)<br>(2, 8, 1)<br>(3, 8, 1)<br>(4, 8, 1)<br>(5, 8, 1) | (1, 11, 1)<br>(2, 11, 1)<br>(3, 11, 1)<br>(4, 11, 1)<br>(5, 11, 1) |
| (1, 3, 1)<br>(2, 3, 1)<br>(3, 3, 1)<br>(4, 3, 1)<br>(5, 3, 1) | (1, 6, 1)<br>(2, 6, 1)<br>(3, 6, 1)<br>(4, 6, 1)<br>(5, 6, 1) | (1, 9, 1)<br>(2, 9, 1)<br>(3, 9, 1)<br>(4, 9, 1)<br>(5, 9, 1) | (1, 12, 1)<br>(2, 12, 1)<br>(3, 12, 1)<br>(4, 12, 1)<br>(5, 12, 1) |
| (1, 1, 2)<br>(2, 1, 2)<br>(3, 1, 2)<br>(4, 1, 2)<br>(5, 1, 2) | (1, 4, 2)<br>(2, 4, 2)<br>(3, 4, 2)<br>(4, 4, 2)<br>(5, 4, 2) | (1, 7, 2)<br>(2, 7, 2)<br>(3, 7, 2)<br>(4, 7, 2)<br>(5, 7, 2) | (1, 10, 2)<br>(2, 10, 2)<br>(3, 10, 2)<br>(4, 10, 2)<br>(5, 10, 2) |
| (1, 2, 2)<br>(2, 2, 2)<br>(3, 2, 2)<br>(4, 2, 2)<br>(5, 2, 2) | (1, 5, 2)<br>(2, 5, 2)<br>(3, 5, 2)<br>(4, 5, 2)<br>(5, 5, 2) | (1, 8, 2)<br>(2, 8, 2)<br>(3, 8, 2)<br>(4, 8, 2)<br>(5, 8, 2) | (1, 11, 2)<br>(2, 11, 2)<br>(3, 11, 2)<br>(4, 11, 2)<br>(5, 11, 2) |
| (1, 3, 2)<br>(2, 3, 2)<br>(3, 3, 2)<br>(4, 3, 2)<br>(5, 3, 2) | (1, 6, 2)<br>(2, 6, 2)<br>(3, 6, 2)<br>(4, 6, 2)<br>(5, 6, 2) | (1, 9, 2)<br>(2, 9, 2)<br>(3, 9, 2)<br>(4, 9, 2)<br>(5, 9, 2) | (1, 12, 2)<br>(2, 12, 2)<br>(3, 12, 2)<br>(4, 12, 2)<br>(5, 12, 2) |

| pe0 | | pe1 | | pe2 | | pe3 | | pe4 | |
|---|---|---|---|---|---|---|---|---|---|
| (1, 1, 1) | (1, 1, 2) | (1, 2, 1) | (1, 2, 2) | (1, 3, 1) | (1, 3, 2) | (1, 4, 1) | (1, 4, 2) | (1, 5, 1) | (1, 5, 2) |
| (2, 1, 1) | (2, 1, 2) | (2, 2, 1) | (2, 2, 2) | (2, 3, 1) | (2, 3, 2) | (2, 4, 1) | (2, 4, 2) | (2, 5, 1) | (2, 5, 2) |
| (3, 1, 1) | (3, 1, 2) | (3, 2, 1) | (3, 2, 2) | (3, 3, 1) | (3, 3, 2) | (3, 4, 1) | (3, 4, 2) | (3, 5, 1) | (3, 5, 2) |
| (4, 1, 1) | (4, 1, 2) | (4, 2, 1) | (4, 2, 2) | (4, 3, 1) | (4, 3, 2) | (4, 4, 1) | (4, 4, 2) | (4, 5, 1) | (4, 5, 2) |
| (5, 1, 1) | (5, 1, 2) | (5, 2, 1) | (5, 2, 2) | (5, 3, 1) | (5, 3, 2) | (5, 4, 1) | (5, 4, 2) | (5, 5, 1) | (5, 5, 2) |

| pe5 | | pe6 | | pe7 | | pe8 | | pe9 | |
|---|---|---|---|---|---|---|---|---|---|
| (1, 6, 1) | (1, 6, 2) | (1, 7, 1) | (1, 7, 2) | (1, 8, 1) | (1, 8, 2) | (1, 9, 1) | (1, 9, 2) | (1, 10, 1) | (1, 10, 2) |
| (2, 6, 1) | (2, 6, 2) | (2, 7, 1) | (2, 7, 2) | (2, 8, 1) | (2, 8, 2) | (2, 9, 1) | (2, 9, 2) | (2, 10, 1) | (2, 10, 2) |
| (3, 6, 1) | (3, 6, 2) | (3, 7, 1) | (3, 7, 2) | (3, 8, 1) | (3, 8, 2) | (3, 9, 1) | (3, 9, 2) | (3, 10, 1) | (3, 10, 2) |
| (4, 6, 1) | (4, 6, 2) | (4, 7, 1) | (4, 7, 2) | (4, 8, 1) | (4, 8, 2) | (4, 9, 1) | (4, 9, 2) | (4, 10, 1) | (4, 10, 2) |
| (5, 6, 1) | (5, 6, 2) | (5, 7, 1) | (5, 7, 2) | (5, 8, 1) | (5, 8, 2) | (5, 9, 1) | (5, 9, 2) | (5, 10, 1) | (5, 10, 2) |

| pe0 | pe1 | pe2 | pe3 |
|---|---|---|---|
| (1, 1, 1, 1, 1)<br>(5, 3, 1, 1, 1) | (1, 4, 1, 1, 1)<br>(5, 6, 1, 1, 1) | (1, 7, 1, 1, 1)<br>(5, 9, 1, 1, 1) | (1, 10, 1, 1, 1)<br>(5, 12, 1, 1, 1) |
| (1, 1, 2, 1, 1)<br>(5, 3, 2, 1, 1) | (1, 4, 2, 1, 1)<br>(5, 6, 2, 1, 1) | (1, 7, 2, 1, 1)<br>(5, 9, 2, 1, 1) | (1, 10, 2, 1, 1)<br>(5, 12, 2, 1, 1) |
| (1, 1, 1, 2, 1)<br>(5, 3, 1, 2, 1) | (1, 4, 1, 2, 1)<br>(5, 6, 1, 2, 1) | (1, 7, 1, 2, 1)<br>(5, 9, 1, 2, 1) | (1, 10, 1, 2, 1)<br>(5, 12, 1, 2, 1) |
| (1, 1, 2, 2, 1)<br>(5, 3, 2, 2, 1) | (1, 4, 2, 2, 1)<br>(5, 6, 2, 2, 1) | (1, 7, 2, 2, 1)<br>(5, 9, 2, 2, 1) | (1, 10, 2, 2, 1)<br>(5, 12, 2, 2, 1) |
| (1, 1, 1, 1, 2)<br>(5, 3, 1, 1, 2) | (1, 4, 1, 1, 2)<br>(5, 6, 1, 1, 2) | (1, 7, 1, 1, 2)<br>(5, 9, 1, 1, 2) | (1, 10, 1, 1, 2)<br>(5, 12, 1, 1, 2) |
| (1, 1, 2, 1, 2)<br>(5, 3, 2, 1, 2) | (1, 4, 2, 1, 2)<br>(5, 6, 2, 1, 2) | (1, 7, 2, 1, 2)<br>(5, 9, 2, 1, 2) | (1, 10, 2, 1, 2)<br>(5, 12, 2, 1, 2) |
| (1, 1, 1, 2, 2)<br>(5, 3, 1, 2, 2) | (1, 4, 1, 2, 2)<br>(5, 6, 1, 2, 2) | (1, 7, 1, 2, 2)<br>(5, 9, 1, 2, 2) | (1, 10, 1, 2, 2)<br>(5, 12, 1, 2, 2) |
| (1, 1, 2, 2, 2)<br>(5, 3, 2, 2, 2) | (1, 4, 2, 2, 2)<br>(5, 6, 2, 2, 2) | (1, 7, 2, 2, 2)<br>(5, 9, 2, 2, 2) | (1, 10, 2, 2, 2)<br>(5, 12, 2, 2, 2) |
| (1, 1, 1, 1, 3)<br>(5, 3, 1, 1, 3) | (1, 4, 1, 1, 3)<br>(5, 6, 1, 1, 3) | (1, 7, 1, 1, 3)<br>(5, 9, 1, 1, 3) | (1, 10, 1, 1, 3)<br>(5, 12, 1, 1, 3) |
| (1, 1, 2, 1, 3)<br>(5, 3, 2, 1, 3) | (1, 4, 2, 1, 3)<br>(5, 6, 2, 1, 3) | (1, 7, 2, 1, 3)<br>(5, 9, 2, 1, 3) | (1, 10, 2, 1, 3)<br>(5, 12, 2, 1, 3) |
| (1, 1, 1, 2, 3)<br>(5, 3, 1, 2, 3) | (1, 4, 1, 2, 3)<br>(5, 6, 1, 2, 3) | (1, 7, 1, 2, 3)<br>(5, 9, 1, 2, 3) | (1, 10, 1, 2, 3)<br>(5, 12, 1, 2, 3) |
| (1, 1, 2, 2, 3)<br>(5, 3, 2, 2, 3) | (1, 4, 2, 2, 3)<br>(5, 6, 2, 2, 3) | (1, 7, 2, 2, 3)<br>(5, 9, 2, 2, 3) | (1, 10, 2, 2, 3)<br>(5, 12, 2, 2, 3) |
| (1, 1, 1, 1, 3)<br>(5, 3, 1, 1, 4) | (1, 4, 1, 1, 4)<br>(5, 6, 1, 1, 4) | (1, 7, 1, 1, 4)<br>(5, 9, 1, 1, 4) | (1, 10, 1, 1, 4)<br>(5, 12, 1, 1, 4) |
| (1, 1, 2, 1, 4)<br>(5, 3, 2, 1, 4) | (1, 4, 2, 1, 4)<br>(5, 6, 2, 1, 4) | (1, 7, 2, 1, 4)<br>(5, 9, 2, 1, 4) | (1, 10, 2, 1, 4)<br>(5, 12, 2, 1, 4) |
| (1, 1, 1, 2, 4)<br>(5, 3, 1, 2, 4) | (1, 4, 1, 2, 4)<br>(5, 6, 1, 2, 4) | (1, 7, 1, 2, 4)<br>(5, 9, 1, 2, 4) | (1, 10, 1, 2, 4)<br>(5, 12, 1, 2, 4) |
| (1, 1, 2, 2, 4)<br>(5, 3, 2, 2, 4) | (1, 4, 2, 2, 4)<br>(5, 6, 2, 2, 4) | (1, 7, 2, 2, 4)<br>(5, 9, 2, 2, 4) | (1, 10, 2, 2, 4)<br>(5, 12, 2, 2, 4) |

| FIG.13A | FIG.13B |
|---|---|

| pe4 | pe5 | pe6 | pe7 |
|---|---|---|---|
| (1, 1, 1, 3, 1)<br>(5, 3, 1, 3, 1) | (1, 4, 1, 3, 1)<br>(5, 6, 1, 3, 1) | (1, 7, 1, 3, 1)<br>(5, 9, 1, 3, 1) | (1, 10, 1, 3, 1)<br>(5, 12, 1, 3, 1) |
| (1, 1, 2, 3, 1)<br>(5, 3, 2, 3, 1) | (1, 4, 2, 3, 1)<br>(5, 6, 2, 3, 1) | (1, 7, 2, 3, 1)<br>(5, 9, 2, 3, 1) | (1, 10, 2, 3, 1)<br>(5, 12, 2, 3, 1) |
| (1, 1, 1, 4, 1)<br>(5, 3, 1, 4, 1) | (1, 4, 1, 4, 1)<br>(5, 6, 1, 4, 1) | (1, 7, 1, 4, 1)<br>(5, 9, 1, 4, 1) | (1, 10, 1, 4, 1)<br>(5, 12, 1, 4, 1) |
| (1, 1, 2, 4, 1)<br>(5, 3, 2, 4, 1) | (1, 4, 2, 4, 1)<br>(5, 6, 2, 4, 1) | (1, 7, 2, 4, 1)<br>(5, 9, 2, 4, 1) | (1, 10, 2, 4, 1)<br>(5, 12, 2, 4, 1) |
| (1, 1, 1, 3, 2)<br>(5, 3, 1, 3, 2) | (1, 4, 1, 3, 2)<br>(5, 6, 1, 3, 2) | (1, 7, 1, 3, 2)<br>(5, 9, 1, 3, 2) | (1, 10, 1, 3, 2)<br>(5, 12, 1, 3, 2) |
| (1, 1, 2, 3, 2)<br>(5, 3, 2, 3, 2) | (1, 4, 2, 3, 2)<br>(5, 6, 2, 3, 2) | (1, 7, 2, 3, 2)<br>(5, 9, 2, 3, 2) | (1, 10, 2, 3, 2)<br>(5, 12, 2, 3, 2) |
| (1, 1, 1, 4, 2)<br>(5, 3, 1, 4, 2) | (1, 4, 1, 4, 2)<br>(5, 6, 1, 4, 2) | (1, 7, 1, 4, 2)<br>(5, 9, 1, 4, 2) | (1, 10, 1, 4, 2)<br>(5, 12, 1, 4, 2) |
| (1, 1, 2, 4, 2)<br>(5, 3, 2, 4, 2) | (1, 4, 2, 4, 2)<br>(5, 6, 2, 4, 2) | (1, 7, 2, 4, 2)<br>(5, 9, 2, 4, 2) | (1, 10, 2, 4, 2)<br>(5, 12, 2, 4, 2) |
| (1, 1, 1, 3, 3)<br>(5, 3, 1, 3, 3) | (1, 4, 1, 3, 3)<br>(5, 6, 1, 3, 3) | (1, 7, 1, 3, 3)<br>(5, 9, 1, 3, 3) | (1, 10, 1, 3, 3)<br>(5, 12, 1, 3, 3) |
| (1, 1, 2, 3, 3)<br>(5, 3, 2, 3, 3) | (1, 4, 2, 3, 3)<br>(5, 6, 2, 3, 3) | (1, 7, 2, 3, 3)<br>(5, 9, 2, 3, 3) | (1, 10, 2, 3, 3)<br>(5, 12, 2, 3, 3) |
| (1, 1, 1, 4, 3)<br>(5, 3, 1, 4, 3) | (1, 4, 1, 4, 3)<br>(5, 6, 1, 4, 3) | (1, 7, 1, 4, 3)<br>(5, 9, 1, 4, 3) | (1, 10, 1, 4, 3)<br>(5, 12, 1, 4, 3) |
| (1, 1, 2, 4, 3)<br>(5, 3, 2, 4, 3) | (1, 4, 2, 4, 3)<br>(5, 6, 2, 4, 3) | (1, 7, 2, 4, 3)<br>(5, 9, 2, 4, 3) | (1, 10, 2, 4, 3)<br>(5, 12, 2, 4, 3) |
| (1, 1, 1, 3, 4)<br>(5, 3, 1, 3, 4) | (1, 4, 1, 3, 4)<br>(5, 6, 1, 3, 4) | (1, 7, 1, 3, 4)<br>(5, 9, 1, 3, 4) | (1, 10, 1, 3, 4)<br>(5, 12, 1, 3, 4) |
| (1, 1, 2, 3, 4)<br>(5, 3, 2, 3, 4) | (1, 4, 2, 3, 4)<br>(5, 6, 2, 3, 4) | (1, 7, 2, 3, 4)<br>(5, 9, 2, 3, 4) | (1, 10, 2, 3, 4)<br>(5, 12, 2, 3, 4) |
| (1, 1, 1, 4, 4)<br>(5, 3, 1, 4, 4) | (1, 4, 1, 4, 4)<br>(5, 6, 1, 4, 4) | (1, 7, 1, 4, 4)<br>(5, 9, 1, 4, 4) | (1, 10, 1, 4, 4)<br>(5, 12, 1, 4, 4) |
| (1, 1, 2, 4, 4)<br>(5, 3, 2, 4, 4) | (1, 4, 2, 4, 4)<br>(5, 6, 2, 4, 4) | (1, 7, 2, 4, 4)<br>(5, 9, 2, 4, 4) | (1, 10, 2, 4, 4)<br>(5, 12, 2, 4, 4) |

FIG. 14

| FIG. 14A | FIG. 14B |
|---|---|

FIG. 14B

| (l, l, k, l, m) |
| (5, 3, k, l, m) |

PRESENTS

| (1, 1, k, l, m) |
| (2, 1, k, l, m) |
| (3, 1, k, l, m) |
| (4, 1, k, l, m) |
| (5, 1, k, l, m) |
| (1, 2, k, l, m) |
| (2, 2, k, l, m) |
| (3, 2, k, l, m) |
| (4, 2, k, l, m) |
| (5, 2, k, l, m) |
| (1, 3, k, l, m) |
| (2, 3, k, l, m) |
| (3, 3, k, l, m) |
| (4, 3, k, l, m) |
| (5, 3, k, l, m) |

METHOD AND APPARATUS FOR GENERATING ADDRESSES IN PARALLEL PROCESSING SYSTEMS

BACKGROUND OF THE INVENTION

1. Field of the Invention

The present invention relates to an address generating unit and a method thereof for accessing distributed data arranged in a multiprocessor system such as a parallel computer.

2. Description of the Related Art

With the recent widespread use of parallel computer systems, more advances towards high-speed processing are desirable. Generally, a parallel processing system comprising a plurality of processing elements(hereinafter, referred to as "PE"s only) performs parallel operations thereby.

In performing a parallel operation in a parallel computer system of a distributed memory type, a case arises where a certain PE is required to access data stored in a local memory of another PE, depending upon its own processing state. For example, in a system in which a vector operation is processed in parallel, array data to be processed in parallel is divided and stored in a storage unit of each PE, so that it is required to be recognized in which PE storage unit the necessary array data exists.

Conventionally, in performing a vector-operation as described above, a PE obtains the PE having the array elements to be processed therein from their subscripts through processing using software, and the addresses within the PE where array elements exist to be processed are obtained by a global address generating unit provided within a network processing unit. According to this method, each PE obtains the PE having an array element to be operated existing therein through processing by a scalar unit stored in each PE.

However, a conventional method of generating storage addresses for array elements described above has the following problems.

When subscripts of an array are given, the PE having the array element therein has been obtained through a complicated address calculation by software processing, and thus its processing has required considerable time. Consequently, the processing overhead required for this address calculation has prevented high-speed processing thereof.

Besides, a vector unit requiring array elements accesses a global address generating unit via a main storage control unit, thereby requiring a long time for obtaining addresses within a PE.

For this reason, it takes a long time to obtain array elements required by each PE for its operation, consequently resulting in lowering the efficiency of the parallel processing.

SUMMARY OF THE INVENTION

The present invention aims to provide an address generating unit and the method thereof which enables high-speed processing by increasing efficiency in the parallel processing in a multiprocessor system of a distributed memory type.

According to the present invention, in a parallel computer system of a distributed shared memory type, high-speed calculation of an address for accessing all local storage units of all PEs is enabled by hardware, thereby allowing the overhead for parallel processing to be reduced and enabling the efficiency of the parallel processing to be increased.

The present invention relates to an address generating unit and a method thereof for dividing data, such as an array, to be arranged in a plurality of PEs and for performing parallel processing.

A local address generating unit is activated by the first class access command for accessing of a main storage unit within a self-PE, and issues an address for accessing a main storage unit provided within a self-PE.

A global address generating unit is activated by the second class access command which enables access of a main storage unit within a self-PE, and issues a global address for accessing one of main memories provided within a plurality of PEs as described above.

In addition, a global address generating unit is provided, for example, within a vector unit in each PE, which issues the global address described above, to a main storage control unit within a self-PE when accessing a main storage within a self-PE, and to a network processing unit within a self-PE when accessing a main storage unit provided in another PE.

Further, the global address generating unit is provided with a PE number generating unit for generating a PE number in response to dividing data, and an in-PE address generating unit for generating an in-PE address in response to data division.

Moreover, the global address generating unit generates an address in the first direction with respect to a PE number and an address in the second direction with respect to an in-PE address, or an address in the first direction with respect to a group of PEs and an address in the second direction with respect to an in-PE address. Also, the unit generates an address in the first direction with respect to a group of PEs, and an address in the second direction with respect to the number of in-group PEs, and an address in the third direction with an in-PE address.

The local address generating device corresponds to a local address generating unit, and the global address generating device corresponds to a global address generating unit. And also, a PE number generating unit and an in-PE address generating unit correspond to, in the configuration of each global address generating unit, a circuit portion for generating each PE number, and a circuit portion for generating an in-PE address respectively.

The local address generating unit and the global address generating unit are provided independently of each other, and in addition, when an access command is issued, by which main storage units within a plurality of PEs within a system are to be accessed, the global address generating unit automatically generates a global address for accessing a main storage unit within another PE, thereby enabling an access address for accessing a main storage unit within all PEs, including a self-PE, to be obtained at high speed.

The global address generating unit is provided within a vector unit within each PE, and thus a vector unit is not required to request an issue of a global address through a main storage unit. In addition, main storage units within the PEs can be accessed only by outputting a global address thus created, directly to a network processing unit only.

The global address generating units divide addresses into a portion relating to an PE number in the first direction, and a portion relating to an in-PE address with respect to a PE number in the second direction, for the control thereof. Moreover, it divides addresses into a portion with respect to a PE number and an in-PE address in the first direction, and a portion with respect to an in-PE address in the second direction, for the control thereof. Furthermore, it divides addresses into a portion with respect to a group of PEs in the first direction, a portion with respect to the number of PEs within a group in the second direction, and an portion with respect to an in-PE address in the third direction, for the control thereof. Whereby, addresses can be calculated without difficulty.

As described above, global addresses are generated in response to the dividing of data at high speed, thereby enabling a reduction of the overhead required for parallel operation.

BRIEF DESCRIPTION OF THE DRAWINGS

The present invention will be more apparent from the following detailed description, with reference to the accompanying drawings, in which:

FIG. 1 is a block diagram showing a principle of the present invention;

FIG. 2 is a block diagram showing an arrangement of a general parallel computer;

FIG. 7 is a view showing the first example of a divisional arrangement of an array A(5, 10, 2);

FIG. 10 is a view showing the second example of divisional arrangement of an array A(5, 10, 2);

FIG. 14 is a view showing a second part of the third example of a divisional arrangement of an array A(5, 10, 2, 3, 4);

DESCRIPTION OF THE PREFERRED EMBODIMENT

Figure 3:
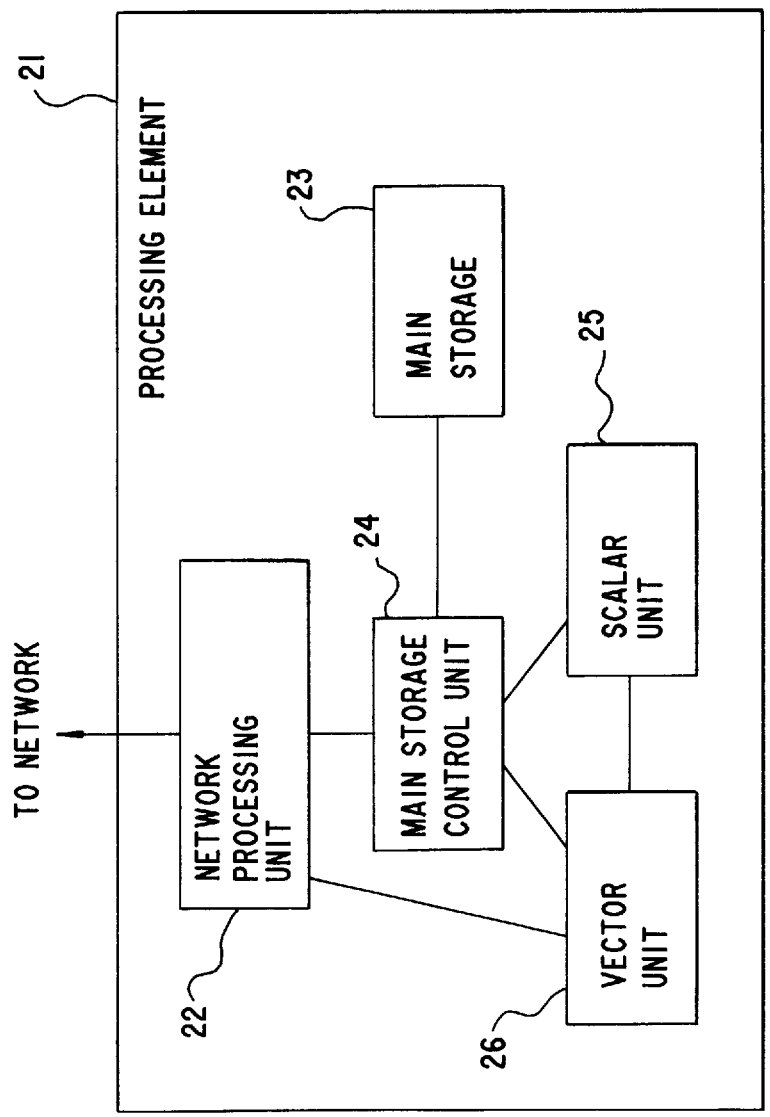
FIG. 3 is a block diagram showing an example of an arrangement of processing elements which is used for an embodiment of the present invention.

An embodiment according to the present invention will be detailed by referring to the drawings, as below.

FIG. 1 shows an principle block diagram of an address generating unit according to the present invention. An address generating unit shown in FIG. 1 is provided with a local address generating unit 1 and a global address generating unit 2.

The local address generating unit 1 is activated by a first class access command for accessing a main storage unit within a self-PE and issues an address for accessing a main storage device provided within a self-PE.

The global address generating unit 2 is activated by a second class access command by which a plurality of main storage units of PEs(not including a self-PE) provided within the system can be accessed, and issues a global address for accessing one PE within the plurality of main storage units of the PEs.

In addition, the global address generating unit 2 is provided within, for example, a vector unit of each PE, and issues the global address described above to a main storage unit control unit within the self-PE when accessing a main storage unit provided within the self-PE, and issues the global address described above to a network processing unit provided within a self-PE when accessing a main storage unit provided within the other PEs.

Furthermore, the global address generating unit 2 is also provided with a PE number generating unit 3 for generating a PE number in response to dividing data, and an in-PE number generating unit 4 for generating an in-PE address in response to dividing data.

Additionally, the global address generating unit 2 generates addresses in a first direction with respect to a PE number and an address in a second direction with respect to an in-PE address, or generates an address in the first direction with respect to a PE number and an address in the second direction with respect to an in-PE address. Or, it generates an address in the first direction with respect to a group of PEs and an address in the second direction address with respect to the number of PEs being present in a group, and an address in the third direction with respect to an in-PE address.

FIG. 2 shows a general arrangement of a parallel computer system of a distributed memory type. In FIG. 2, a plurality of PEs 12-0, 12-1, . . . , 12-n are inter-connected to one another over a network 11. Each PE forms one unit of a computer for executing parallel operation while taking partial charge thereof along with the other PEs, and has previously been assigned a unique number(a PE number).

FIG. 3 shows an example of an internal arrangement of each PE shown in FIG. 2. The PE21 shown in FIG. 3 is provided with a network processing unit 22, a main storage unit 23, a main storage control unit 24, a scalar unit 25, and a vector unit 26.

The main storage unit 23 stores a sequence of instructions(a program) and data. The scalar unit 25 fetches an instruction from the main storage unit 23 through the main storage control unit 24 and executes it when a program starts to be executed. When an instruction thus fetched is a scalar instruction, the scalar unit 25 executes it within the scalar unit 25, while when the instruction thus fetched is a vector instruction, the vector unit 26 is activated to execute it.

In addition, when the instruction thus fetched by the scalar unit 25 is a special control instruction, the scalar unit 25 sometimes controls the network processing unit 22 or the main storage control unit 24, accordingly.

The main storage control unit 24 receives an access request from each memory access requester of the scalar unit 25, the vector unit 26, or the network processing unit 22, arbitrates contention of the access to the main storage unit, and controls access of a memory.

The network processing unit 22 is a mechanism for accessing a main storage unit 23 of different PEs. When an write request is issued to a main storage unit 23 of a different PE by the vector unit 26, the control shifts in the order of a vector circuit 26 of a write requester PE, a network processing unit 22 of the write requester PE, a network 11, a network processing unit of a write requestee PE, a main storage control unit 24 of a write requester PE, and a main storage unit 23 of a write requester PE, thereby a write access request is executed.

When the vector unit 26 issues a read access to a main storage unit 23 of another PE, control shifts in the order of the vector unit 26 of a read access requester PE, the network processing unit 22 of the read access requester PE, a network 11, a network processing unit 22 of the read access requestee PE, a main storage control unit 24 of the read access requestee PE, the main storage unit 23 of the read access requestee, the main storage control unit 24 of the read access requestee, the network processing unit 22 of the read access requestee, the network 11, the network processing unit 22 of the read requester, and a vector unit 26 of the read access requester PE, and the read access described above is executed.

Figure 4:
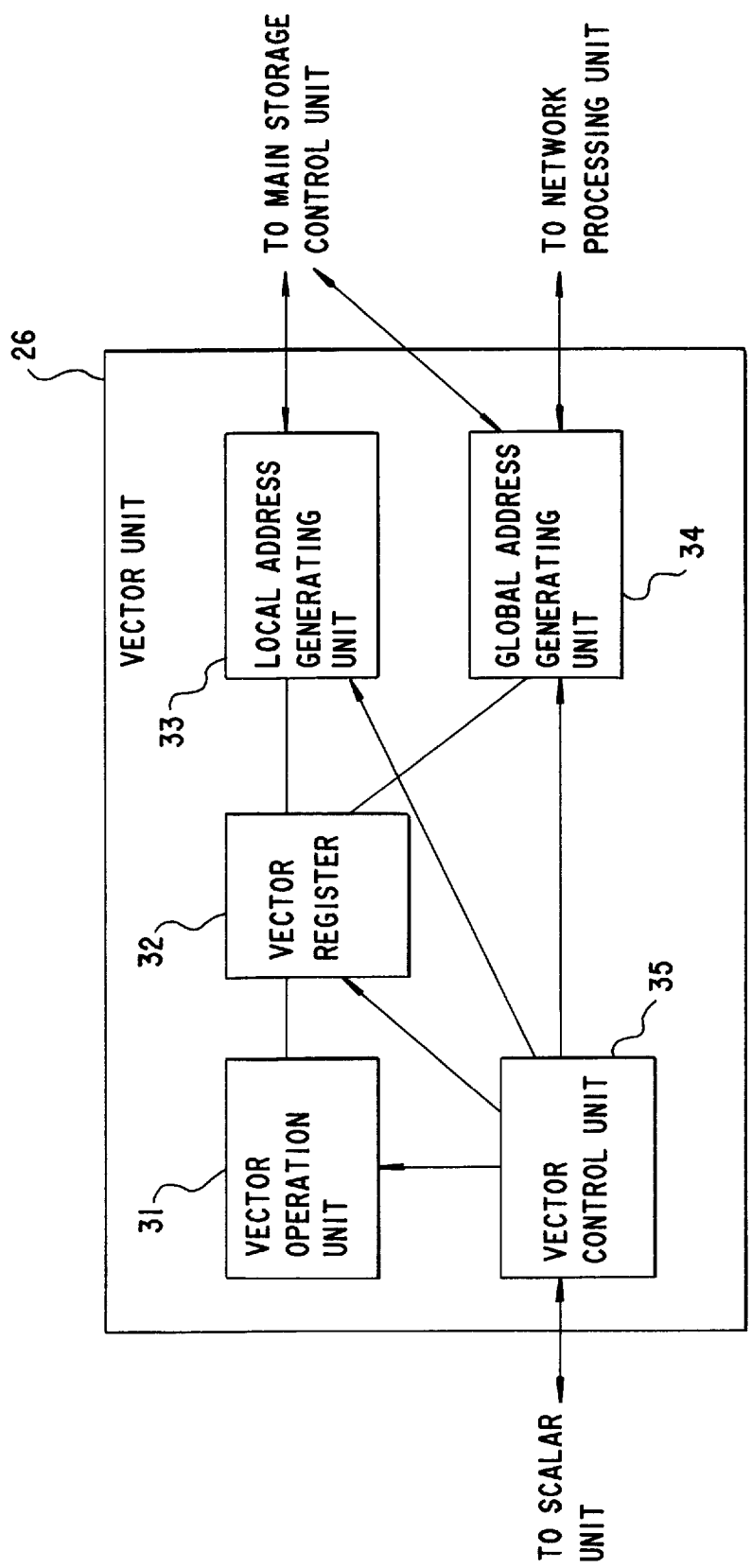
FIG. 4 is a block diagram showing an arrangement of a vector unit according to an embodiment of the present invention.

FIG. 4 shows an arrangement of a vector unit 26 as an embodiment according to the present invention. The vector unit is a mechanism for primarily executing array operation at high-speed, and is composed of a vector operation unit 31, a vector register 32, a local address generating unit 33, a global address generating unit 34, and a vector control unit 35.

The operation unit 31, when receiving a vector operation instruction, reads out array data from a vector register 32 and performs array operation processing such as multiplication, addition, etc., and stores the results obtained by thus calculating.

The vector register 32 retains intermediate results of an array operation, and acts as an interface between the main storage unit 23 and the vector operation unit 31. The vector register 32 stores array data read out from the main storage unit 23 or operated results in the vector operation unit 31. Additionally, the contents of the vector register 32 are stored by a vector store instruction.

The vector control unit 31 controls an entire vector unit 26. The instruction which the scalar unit 25 reads out is a vector instruction, the vector operation unit 31 sends the instruction to the vector control unit 35. The vector control unit 35 determines what the received instruction is. If the instruction is a vector operation instruction, the vector control unit 35 directs an operand to be read out to the vector register 32 and directs an vector operation to be executed to the vector operation unit 31, and directs the vector register 32 to store the operated results.

If the instruction which the vector control unit 35 received is a local memory access instruction (including a write instruction and a read instruction), the vector control unit 35 directs the local address generating unit 33 to access the main storage unit within a self-PE. If the instruction received is a global access instruction, the vector control unit 35 directs the global address generating unit 34 to access the main storage units of all PEs.

The local address generating unit 33 generates an address to access a main storage unit 23 of a self-PE, and issues an access request. When the vector control unit 35 issues an access command to the local address generating unit 33, the local address generating unit 33 sequentially generates main storage addresses within the self-PE start address specified by the command to the end address specified by the access direction.

The global address generating unit 34 generates addresses accessible to all main storage control units 23 being present within all PEs, including a self-PE, and issues an access request. The vector control unit 35 issues an access direction to the global address generating unit 34, the global address generating unit 34 sequentially generates PE numbers and addresses within the main storage unit 24 within a self-PE from the start address to the end address specified by the direction. When a PE number equals that of a self-PE, the vector control unit 35 issues an access request to the main storage control unit 24 provided within a self-PE, while when a PE is different from that of a self-PE, accesses a main storage unit 23 of another PE via the network processing unit 22.

The present invention is characterized in that a global address generating unit 34 is provided as hardware for obtaining PE numbers and addresses within a main storage unit as required by a global access instruction.

The local address generating unit 1 shown in FIG. 1 corresponds to a local address generating unit 33 shown in FIG. 4, and the global address generating unit 2 shown in FIG. 1 corresponds to the global address generating unit 34. Further, the PE number generating unit 3 and the in-PE address generating unit 4 correspond to a circuit portion for generating PE numbers and a circuit portion for generating in-PE addresses in an arrangement of each global address generating unit shown in FIGS. 5, 9, 12, 15, and 16.

Next, an embodied arrangement of a global address generating unit 34 and an example of a divisionally arranged array will be explained with reference to FIGS. 5 though 15.

Figure 5:
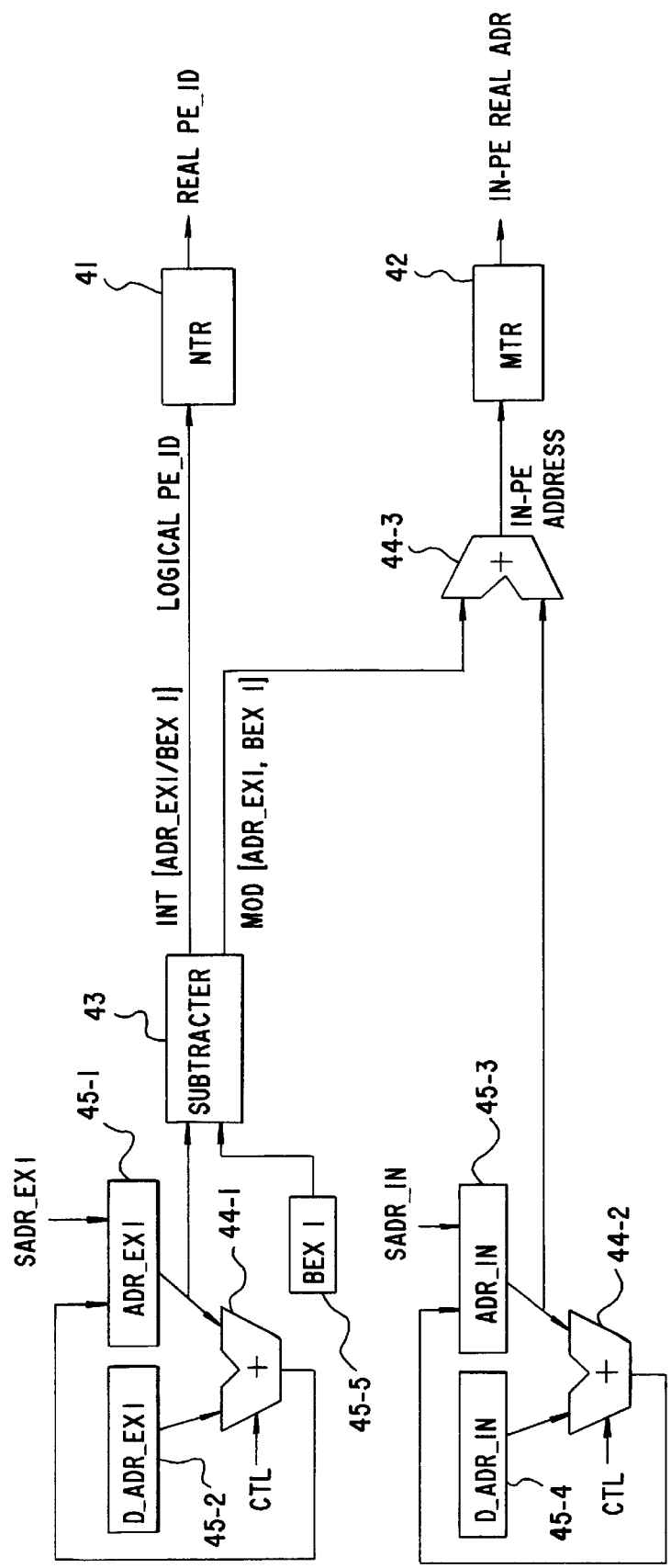
FIG. 5 is a circuit diagram of a first global address generating unit which corresponds to uniaxial division according to an embodiment of the present invention.

FIG. 5 shows a global address generating unit which corresponds to an uniaxial division of an array. The global address generating unit shown in FIG. 5 is composed of registers 45-1, 45-2, 45-3, 45-4, and 45-5, adders 44-1, 44-2, and 44-3, a subtracter 43, a NTR 41(Network Address Translation Register), and a MTR 42(Memory Address Translation Register).

The address register 45-1 retains an access address adr_exl in the primary direction(a direction which depends upon a divisional axis) and the distance register 45-2 retains an address increment value d_adr_exl in the primary direction. The adder 44-1 adds adr_exl and d_adr_exl and stores the result obtained by thus adding.

A band width register 45-5 retains a value of a band width bexl of a divisional axis, and the subtracter 43 obtains a quotient int{adr_exl/bexl} and a residue mod{Adr_exl, bexl} when adr_exl is divided by bexl. And, it sends int{adr_exl/bexl} to a NTR 41 by specifying it as a logical PE number(logical PE-id). The NTR 41 converts a logical PE number to a physical PE number(real PE-id).

The address register 45-3 retains an access address adr_in the secondary direction(a direction independent of a divisional axis), and the distance register 45-4 retains an address increment value d_adr_in. The adder 44-2 adds adr_in and d_adr_in and stores the result in the address register 45-3 as adr_in.

The adder 44-3 adds mod{adr_exl, bexl} and adr_in given by the subtracter 43 and the address register 45-3 to obtain a logical in-PE address number. The MTR 42 converts a logical in-PE address to a real address(real in-PE adr).

The adders 44-1 and 44-2 performs addition while a control signal ctl is on, in synchronism with a clock signal, not shown, and terminates addition when the control signal ctl turns off. The control signal ctl is generated by a control signal generating unit provided outside or inside of the global address generating unit 34.

Figure 6:
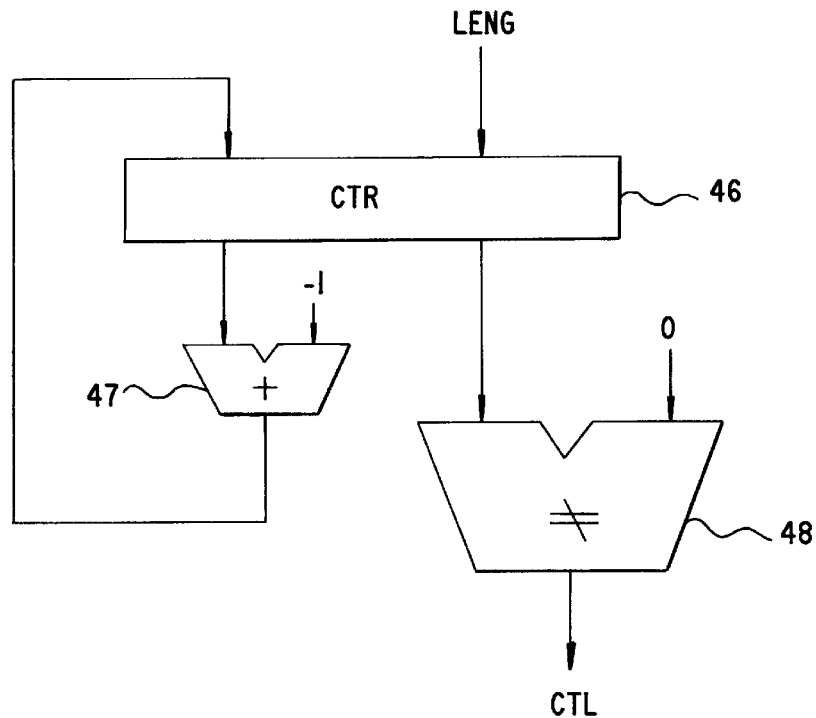
FIG. 6 is a circuit diagram showing a control signal generating unit.

FIG. 6 shows an example of an arrangement of a control signal generator. A control signal generating unit shown in FIG. 6 comprises a register 46, an adder 47, and a comparator 48. The register 46 retains an account value ctr, and the adder 47 adds-1 to ctr and stores the result in the register 46 by being specified as ctr. An initial value of ctr is given by a transfer length leng. The comparator 48 compares ctr with zero[0]. At this time, ctr not being zero[0] turns the control signal ctl on for outputting, while ctr being zero[0] turns off the control signal ctl.

In other words, the control signal generating unit decrements a given value of leng one[1] by one[1] and directs the adders 44-1 and 44-2 to perform an addition operation using the control signal ctl until the value of leng becomes zero[0].

When an array is divided into a plurality of PEs and arranged, it will be explained below how the array is accessed by the global address generating unit shown in FIG. 5.

For example, a three-dimensional array having a size of 5×10×2 is described as A(5, 10, 2) in FORTRAN. In general, when a three-dimensional array having a size of ni×nj×nk is defined as A(ni, nj, nk), A(5, 10, 2) results in the following; ni=5, nj=10, nk=2. Additionally, at this time, each element of an array A(ni, nj, nk) is specified as A(i, j, k)(i=1, . . . , ni, j=1, . . . , nj, k=1, . . . , nk).

Now, let it consider a case where an array A(5, 10, 2) is subjected to parallel processing by four[4] PEs, i.e., pe0, pe1, pe2, and pe3. For example, an array is divided in the direction of a subscript nj(in the j direction), as will be described below.

Assuming that npel is specified as the number of a PE(Processing Element) and bj is specified as a fraction point per one[1]PE in the j direction, i.e.,
bj=CEIL(nj=npel)(where, CEIL is a round-off function.),
bj=CEIL(10/4)=3 is obtained;
npel=4
bj=CEIL(10/4)=3 is obtained, and is divided as follows;

| | aoff | |
|---|---|---|
| | pe0 | A(5, 1 : 3, 2) |
| | pe1 | A(5, 4 : 6, 2) |
| | pe2 | A(5, 7 : 9, 2) |
| | pe3 | A(5, 10 : 12, 2) | where CEIL(r) represents a round-off value of r(minimum integer not smaller than r). Besides, for example, A(5, 1:3, 2) represents that array elements in a range represented by i=1, 2, 3, 4, 5, j=1, 2, 3, k=1, 2 are stored.

FIG. 7 shows each element of an array A(5, 10, 2) divided and then arranged by these PEs. This shows that array elements having j=1, 2, 3 are stored in pe0, array elements having j=4,5,6 are stored in pe1, array elements having j=7,8,9 are stored in pe2, and array elements having j=10 are stored in pe3.

Since the maximum value of j is 10, pe3 can be represented as A(5, 10:10, 2). However, hereafter in order to maintain the same storage area as for the other PEs, it is specified as A(5, 10:12, 2). Actually, the area corresponding to j=11, 12 is not accessed.

Figure 8:
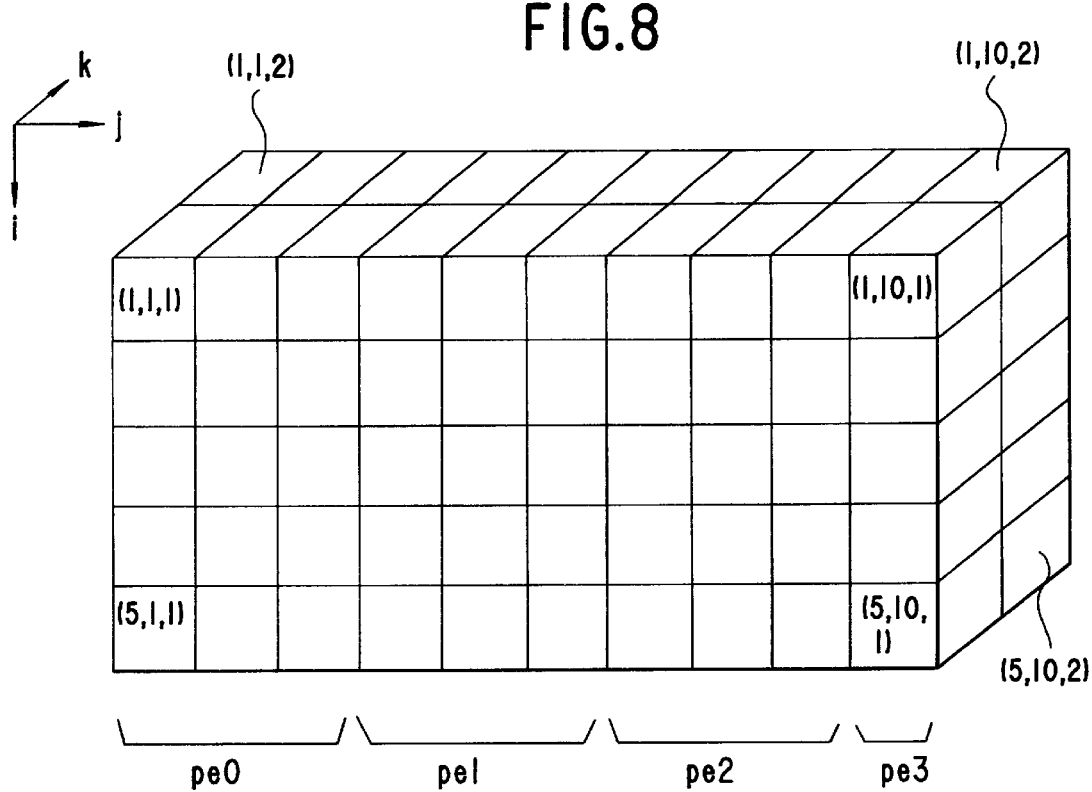
FIG. 8 is a three-dimensional arrangement view showing the first example of a division of the array A(5, 10, 2)

FIG. 8 shows an example of the divisional arrangement shown in FIG. 7 represented three-dimensionally. In FIG. 8, three subscripts i, j, k represent i-axis, j-axis, and k-axis, respectively, and the array A(5, 10, 2) is parallel processed into four[4] by the pe0, pe1, pe2, and pe3 in the direction of j-axis.

At this time, assuming that the direction to be accessed is the i-direction, an operation of the global address generating unit 34 will be explained below.

For example, a case will be considered where both B(i,J,K) and C(i,J,K) are assumed as three-dimensional arrays and there is the following description written in, for example, FORTRAN;

$$do\ i=i1,\ i2\ \ C(i,\ J,\ K)=A(i,\ J,\ K,)+B(i,\ J,\ K) \qquad (i\text{-}0)$$

end do

Hereinafter, focusing on an access portion only of an array A described above, a loop including an access to the array A is described as follows.

$$do\ i=i1,\ i2=A(i,\ J,\ K) \qquad (i\text{-}1)$$

end do (a) Sadr__in is set into a register 45-3. Sadr__in represents a portion independent of a divisional axis(in this example, the j-axis). A start address of an array A(5, 10, 2) on each PE is assumed to be specified as Atop, and Sadr__in is given by the following expression.

$$Sadr\_in=Atop+(i1-1)+ni*bj*(K-1) \qquad (1\text{-}1)$$

(b) Sadr__exl is set into a register 45-1. Sadr__exl is a portion dependent upon a divisional axis within start addresses, and is given by the following expression.

$$Sadr\_exl=(J-1)*ni \qquad (2\text{-}1)$$

(c) bexl is set into a register 45-5. bexl represents a band width of a divisional axis, i.e., a successive area within a PE below the divisional axis in which the PE number is changed in the divisional axis direction (in FIG. 7, areas having a same k value within each PE), and is given by the following expression.

$$bexl=ni*bj=15 \qquad (3\text{-}1)$$

(d) d__Adr__in is set to a register 45-4. d__Adr__in represents a portion independent of a divisional axis within interval values, and is give by the following expression.

$$d\_Adr\_in=1 \qquad (4\text{-}1)$$

(e) d__Adr__exl is set to a register 45-2. d__adr__exl represents a portion dependent on the divisional axis within interval values. In this case, J is a fixed value, and thus the following relation can be obtained.

$$d\_Adr\_exl=0 \qquad (5\text{-}1)$$

(f) leng is set to a register 46. leng represents a transfer length and is given by the expression (6-1) as follows;

$$leng=i2-i1+l \qquad (6\text{-}1)$$

After setting as described above, the global address generating unit 34 automatically generates access addresses for accessing an array element A(i, j, k) to be operated. Since the direction that a subscript ni indicates is irrelevant to the divisional direction, Adr__in which is independent of a PE number changes due to addition, and the same PE is successively accessed.

Now, an access direction is assumed to be the j-direction, and the global address generating unit 34 operates as follows;

For example, a case will be considered where there is the following description written in, for example, FORTRAN.

$$do\ j=j1,\ j2=A(I,\ j,\ K) \qquad (j\text{-}1)$$

end do (a) Sadr_in is set to a register 45-3. At this time, Sadr_in is given by the following expression.

$$Sadr\_in = Atop + (I-1) + ni*bj*(K-1) \tag{1-2}$$

(b) Sadr_exl is set to a register 45-1. At this time, Sadr_exl is given by the following expression.

$$Sadr\_exl = (j1-1)*ni \tag{2-2}$$

(c) bexl is set to a register 45-5. bexl is given by the following expression in the same manner as the expression (3-1).

$$bexl = ni*bj = 15 \tag{3-2}$$

(d) d_Adr_in is set to a register 45-4. At this time, since i and j do not change, d_Adr_in results in, $$d\_Adr\_in = 0 \tag{4-2}$$

(e) d_Adr_exl is set to a register 45-2. At this time, d_Adr_exl represents a size of consecutive areas having the same j value within each PE, and is given by the following expression.

$$d\_Adr\_exl = ni = 5 \tag{5-2}$$

(f) leng is set to a register 46. At this time, leng is given by the following expression.

$$leng = j2 - j1 + 1 \tag{6-2}$$

After setting as described above, the global address generating unit 34 automatically generates an access address for accessing an array element A(I, j, K) to be operated. Since the direction represented by a subscript nj is the divisional direction, Adr_exl relevant to a PE number changes due to addition. Accordingly, an array element to be accessed exceeds a boundary between PEs, a PE number changes and subsequently another PE having this new PE number is accessed.

Assuming that an access direction is a k direction, the global address generating unit 34 operates as follows;

For example, a case will be considered where there is the following description written in, for example, FORTRAN.

$$do\ k=k1,\ k2=A(I,\ J,\ K) \tag{k-1}$$

end do (a) Sadr_in is set to a register 45-3. At this time, Sadr_in is given by the following expression.

$$Sadr\_in = Atop + (I-1) + ni*bj*(k1-1) \tag{1-3}$$

(b) Sadr_exl is set to a register 45-1. At this time, Sadr_exl is given by the following expression which is the same as the expression (2-1).

$$Sadr\_exl = (J-1)*ni \tag{2-3}$$

(c) bexl is set to a register 45-5. At this time, bexl is given using the expression (3-1) as follows;

$$bexl = ni*bj = 15 \tag{3-3}$$

(d) d_Adr_in is set to a register 45-4. At this time, d_Adr_in represents a size of consecutive areas having the same k value within each PE, and is given by the following expression.

$$d\_Adr\_in = ni*bj = 15 \tag{4-3}$$

(e) d_Adr_exl is set to a register 45-2. At this time, since J is a fixed value, the following expression is obtained.

$$d\_Adr\_exl = 0 \tag{5-3}$$

(f) leng is set to a register 46. At this time, leng is given by the following expression.

$$leng = k2 - k1 + 1 \tag{6-3}$$

After setting as described above, the global address generating unit 34 automatically generates access addresses for accessing an array element A(I, j, K) to be operated. The direction determined by a subscript nk that is irrelevant to a divisional axis, so that Adr_in only which is independent of a PE number changes due to addition, and subsequently the same PE is accessed.

The global address generating unit 34 described above shown in FIG. 5 is applicable even to the case where a divisional direction of an array is defined to be the i direction or the j direction (a case where a divisional axis is defined as the i axis or the j axis) without difficulty, only by performing a manipulation to change a part of each of the expressions described above.

Use of the global address generating unit shown in FIG. 5 enables high-speed generation of PE numbers and in-PE addresses in response to division of an array element in one[1] axis direction, which corresponds to one[1] subscript in general. However, a further limitation to a method of dividing an array enables the global address generating unit to be configured as a simpler circuit.

Figure 9:
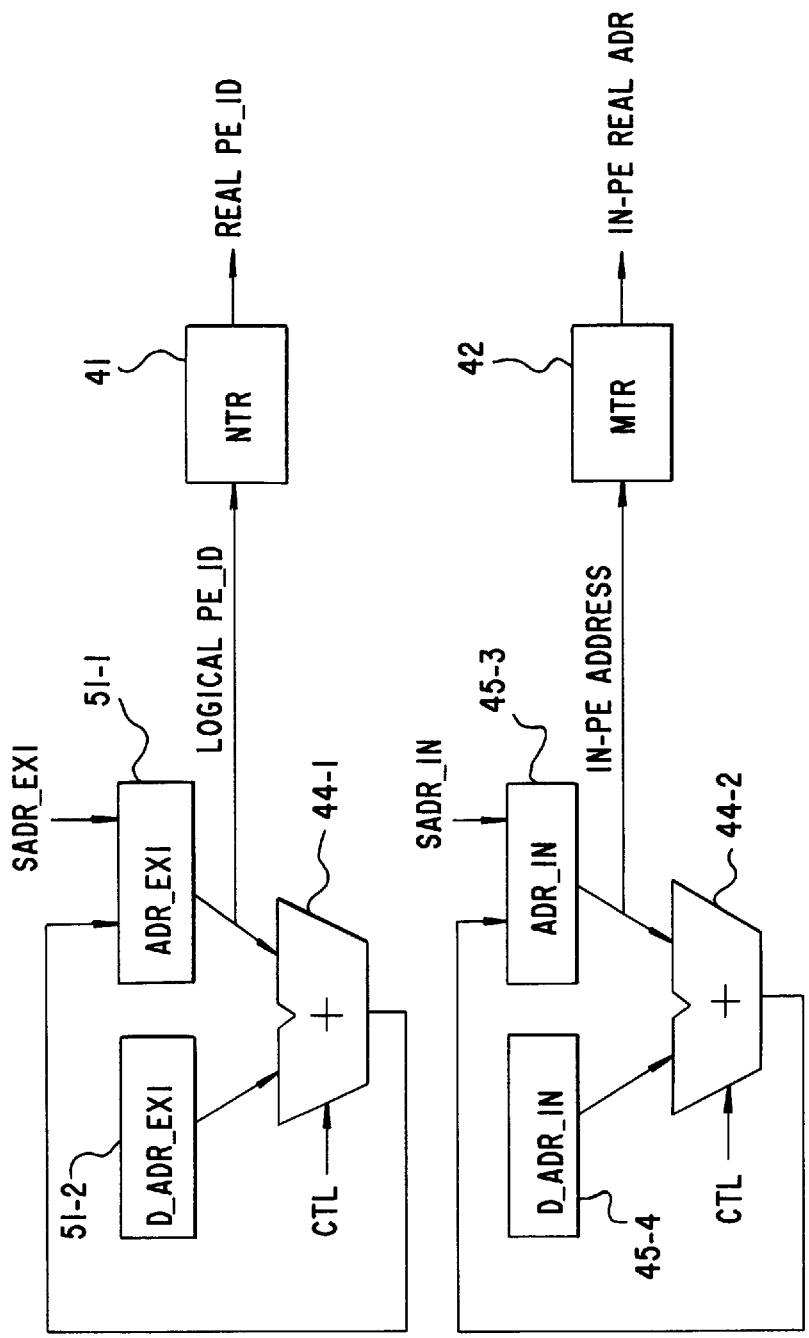
FIG. 9 is a view showing a second global address generating unit which corresponds to a biaxial division according to an embodiment of the present invention.

FIG. 9 shows a global address generating unit which corresponds to one[1] axis division to divide in the j direction, in a case where the number of subscripts and the number of PEs in the divisional direction of an array are equal. In FIG. 9, the same elements as those in FIG. 5 are represented by the same numerals or signs. Additionally, the control signal generating unit for generating a control signal ctl is configured the same as that shown in FIG. 6.

Registers 51-1, and 51-2 have the same function as the registers 45-1 and 45-2 shown in FIG. 5, respectively, but retain values different from each other. The global address generating unit shown in FIG. 9 has a simpler configuration than that shown in FIG. 5, that is, the subtracter 43, the adder 44-3, and the register 45-5 shown in FIG. 5 are not provided.

In this case, a value of Adr_exl is used as a logical PE number without any change thereto, and a value of adr_in is used as a logical in-PE address unchanged. In this fashion, a logical PE number and a logical in-PE number are generated independently of each other.

Next, as an example of a divisional arrangement which the global address generating unit shown in FIG. 9 handles, a case will be discussed below where an array A(5, 10, 2) is parallel processed by ten[10] PEs, i.e., pe0, e1, pe2, pe3, pe4, pe5, pe6, pe7, pe8, and pe9 in the j direction.

At this time, bj=CEIL(10/10)=1 applies, and is divided as follows;

pe0 A(5, 1:1, 2)
pe1 A(5, 2:2, 2)
pe2 A(5, 3:3, 2)
pe3 A(5, 4:4, 2)
pe4 A(5, 5:5, 2)
pe5 A(5, 6:6, 2)
pe6 A(5, 7:7, 2)
pe7 A(5, 8:8, 2)

pe8 A(5, 9:9, 2)

pe9 A(5, 10:10, 2)

where, for example, A(5, 1:1, 2) represents array elements in a range of i=1, 2, 3, 4, 5, j=1, k=1, 2.

FIG. 10 shows each element of the array A(5, 10, 2) parallel processed by these PEs. This shows that ten[10] array elements which correspond to one value of j are stored in each PE.

Figure 11:
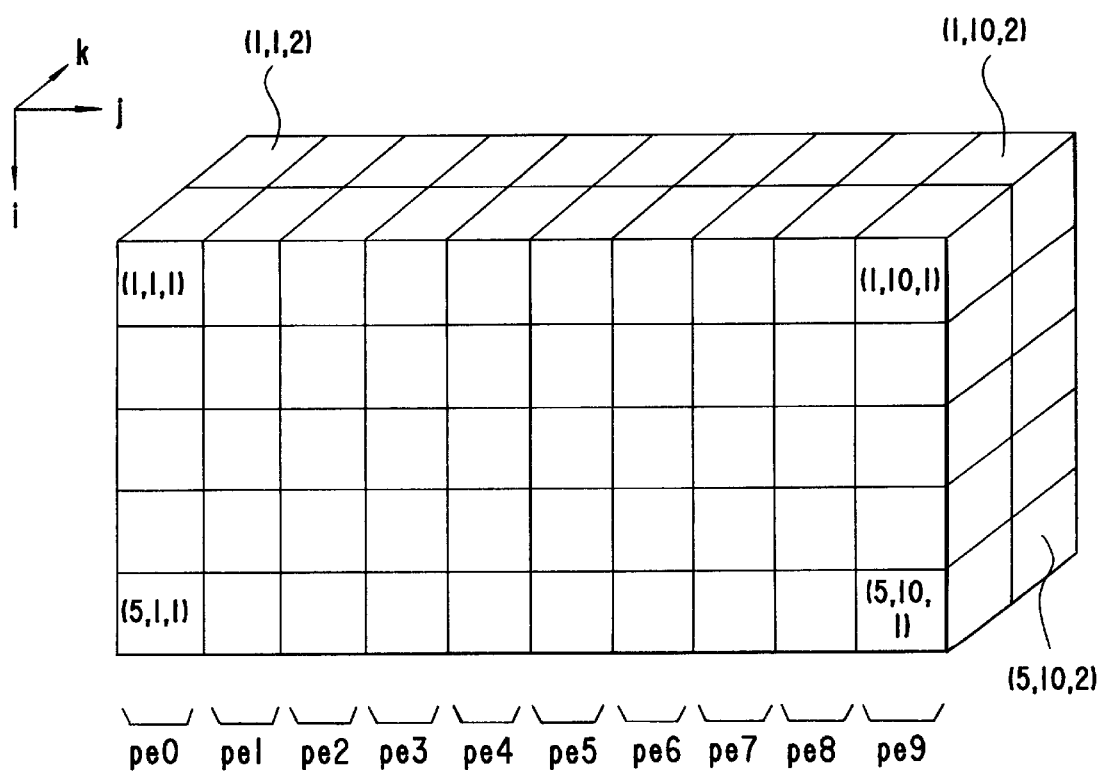
FIG. 11 is a view showing a three-dimensional arrangement showing the second example of a division of an array A(5, 10, 2)

As described above, in this case as the embodiment described hereinbefore, an array A(5, 10, 2) is divided in the j direction. And, using the fact that the number j can be equal to the number of PEs, array elements A(i, j, k) having 1–10 as a value of j are stored in each main storage unit 23 of pe0, pe1, pe2, pe3, pe4, pe5, pe6, pe7, pe8, pe9 with each PE number associated therewith. This enables the circuit configuration of the global address generating unit to be simplified. FIG. 11 shows a three-dimensional example of the divisional arrangement shown in FIG. 10. In FIG. 11, an array A(5, 10, 2) is parallel processed by ten[10] in the j direction by pe0, pe1, pe2, pe3, pe4, pe5, pe6, pe7, pe8, and pe9.

In accessing an array A(5, 10, 2) of this type, each value of Sadr_in, d_Adr_in, and leng is set in the same manner for the case shown in FIG. 5, with the condition of bj=1. With respect to each setting value of Sadr_exl, and d_adr_exl can be represented differently from the case shown in FIG. 5, as will be explained below.

When the access directions are the i and k directions, and, for example, in a loop described by the expression (j−1), the setting values of Aadr_exl and d_Adr_in are given by the following expressions.

$$Sadr\_exl = J - 1 \qquad (2\text{-}4)$$

$$d\_Adr\_exl = 0 \qquad (5\text{-}4)$$

Besides, when an access direction is in a j-direction, and, for example, in a loop represented by the expression (j−1), Sadr_exl and d_Adr_in are given by the following expressions.

$$Sadr\_exl = j1 - 1 \qquad (2\text{-}5)$$

$$d\_Adr\_exl = 1 \qquad (5\text{-}5)$$

In the case of the division shown in FIG. 10, bj=1 holds, so that bexl becomes equal to ni in the expressions (3-1), (3-2), and (3-3). Hence, when an access direction is in the j direction, the band width bexl in the j direction which is a divisional direction becomes equal to d_Adr_exl, and a value of Sadr_exl becomes a multiple of ni. For this reason, a manipulation id is made such that a factor ni is eliminated from the set values Sadr_exl and d_Adr_exl shown by the expressions (2-2) and (5-2) described above, and these set values are given to (2-5) and (5-5), thereby allowing a subtracter 43 to be eliminated.

Next, an example of an arrangement of the global address generating unit corresponding to another divisional method will be explained.

Figure 12:
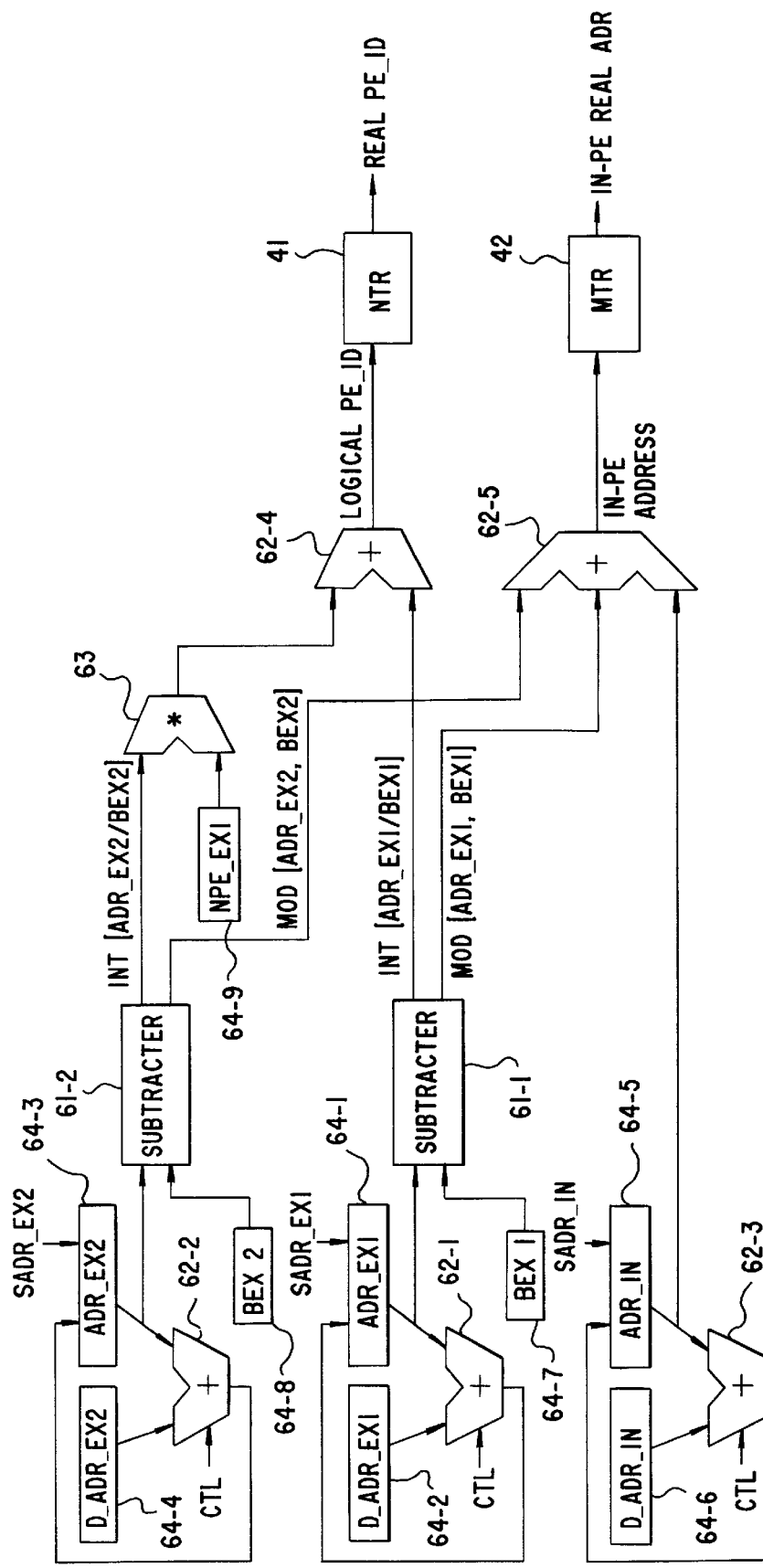
FIG. 12 is a view showing a third global address generating unit which corresponds to a biaxial division according to an embodiment of the present invention.

FIG. 12 shows a global address generating unit corresponding to bi-axial division of an array.

The global address generating unit shown in FIG. 12 is composed of registers 64-1, 64-2, 64-3, 64-4, 64-5, 64-6, 64-7, 64-8, and 64-9, adders 62-1, 62-2, 62-3, 64-4, and 64-5, subtracters 61-1, and 61-2, a multiplier 63, a NTR 41, and a MTR 42. The address registers 64-3 and 64-1 retain an access address Adr_ex2 in the first direction and an access address Adr_exl in the second direction, respectively. Distance registers 64-4, and 64-2 each retain an increment address value d_Adr_ex2 in the first direction and an access address increment value d_Adr_ex2. The adder 62-2 adds Adr_exl and d_Adr_exl and stores its added result in the address register 64-1 by specifying it as Adr_exl. Additionally, the adder 62-2 adds Adr_ex2 and d_Adr_ex2, and stores the added result in the address register 64-3 by specifying it as Adr_ex2.

Band width registers 64-7, and 64-8 each retain a band width value bexl and a band width value bex2. The subtracter 61-1 obtains a pertinent int[Adr_ex2/bex2] and a residue mod[Adr_exl, bexl] obtained by dividing Adr_ex2 by bex2.

The PE number register 64-9 retains an in-group PE number npe_exl. The multiplier 63 multiplies int[Adr_ex2/bex2] given by a subtracter 61-2 by npe_exl from the PE number register 64-9, and outputs the result to the adder 62-4.

The adder 62-4 adds the output of the multiplier 63 and int[Adr_exl/bexl] given by the subtracter 61-1 to obtain a logical PE number(logical PE-id), and sends it to the NTR 41. The NTR 41 converts the logical PE number into a physical PE number(real PE-id).

The address register 64-5 retains the third direction access address Adr_in, while the distance register 64-6 retains an address increment value d_Adr_in in the third direction. The adder 62-3 adds Adr_in and d_Adr_in and stores its added result in the address register 64-5 by specifying it as Adr_in.

The adder 62-5 adds mod[Adr_exl, bexl], and mod[Adr_ex2, bex2] respectively given by the subtracters 61-1, and 61-2 and Adr_in from the address register 64-5 to obtain a logical in-PE address. The MTR 42 converts a logical in-PE address to a real address(real in-PE adr).

The adders 62-1, 62-2, and 62-3 perform addition while a control signal ctl is on, and then terminate addition when the control signal ctr/ctl turns off. The control signal ctl is generated by a control signal generating unit which is similar to that shown in FIG. 6.

It will now be explained below how a divisionally-arranged array is accessed by the global address generating unit shown in FIG. 12.

For example, a five-dimensional array having a size of 5×10×2×3×4 is described as A(5, 10, 2, 3, 4). In general, when a five-dimensional array having a size of ni×nj×nk×nl×nm is defined as A(ni, nj, nk, nl, nm), in the case of A(5, 10, 2, 3, 4), ni=5, nj=10, nk=2, nl=3, and nm=4 applies. In addition, at this time, each element of an array A(ni, nj, nk, nl, nm) is designated as A(i, j, k, l, n)(i=1, . . . ni, j=1, . . . nj, k=1, . . . nk, l=1, . . . nl, m=1, . . . nm).

Now, a case will be discussed below where an array A(5, 10, 2, 3, 4) is parallel-processed by eight[8] PEs of pe0, pe1, pe2, pe3, pe4, pe5, pe6, and pe7. For example, the array is divided in two[2] axis directions, i.e., in the direction of a subscript nj(j-axis direction) and in the direction of a subscript nl(l-axis direction), and then divided in four[4] in the j-axis direction, and further divided into two[2] groups in the l-axis direction.

npe1 is specified as the number of PEs per one[1] group, npe2 is specified as the number of groups. Further, bj is specified as divisional points per one[1] PE in the j direction and bl is specified as divisional points per one[1] PE in the l-axis direction. At this time, the following expressions apply.

bj=CEIL(nj/npe1)=CEIL(10/4)=3 bl=CEIL(nl/npe2)=CEIL(3/2)=2 and is divided as follows;

pe0 A(5, 1:3, 2, 1:2, 4)

pe1 A(5, 4:6, 2, 1:2, 4)

pe2 A(5, 7:9, 2, 1:2, 4)

pe3 A(5, 10:12, 2, 1:2, 4)

pe4 A(5, 1:3, 2, 3:4, 4)

pe5 A(5, 4:6, 2, 3:4, 4)

pe6 A(5, 7:9, 2, 3:4, 4)

pe7 A(5, 10:12, 2, 3:4, 4)

where, for example, A(5, 1:3, 2, 1:2, 4) represents that array elements are stored in a range of i=1, 2, 3, 4, 5, j=1, 2, 3,, k=1, 2, l=1, 2, m=1, 2, 3, 4.

Figure 13B:
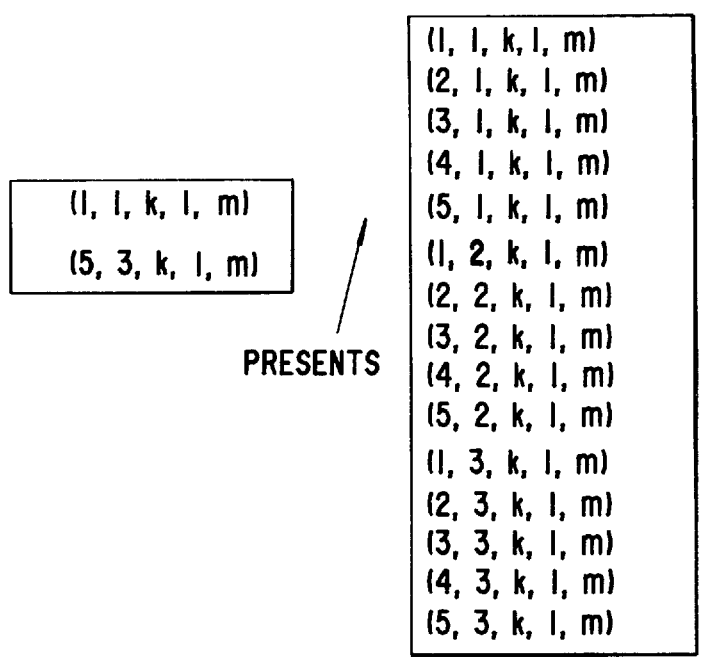
FIG. 13 is a view showing a first part of the third example of a divisional arrangement of an array A(5, 10, 2, 3, 4)

FIGS. 13 and 14 show each array element of the array A(5, 10, 2, 3, 4) divisionally-arranged in these PEs. It is shown that array elements of j=1, 2, 3, l=1, 2, are stored in pe0, array elements of j=4, 5, 6, l=1, 2 are stored in pe1, array elements of j=7, 8, 9, l=1, 2 are stored in pe2, array elements of j=10, l=1, 2 are stored in pe3, array elements of j=1, 2, 3, l=3, 4 are stored in pe4, array elements of j=4, 5, 6, l=3, 4 are stored in pe5, array elements of j=7, 8, 9, l=3, 4 are stored in pe6, and array elements of j=10, l=3, 4 are stored in pe7.

With respect to pe3 and pe7, to maintain storage area having the same size as another PE, areas which correspond to j=11, 12 are set, but in practise these areas are not accessed.

In FIG. 12, int[Adr_exl/bexl] corresponds to a logical PE number in one[1] group, and an output of the multiplier 63 corresponds to a logical PE number of a PE located on the boundaries of a group of PEs. A logical PE number to be accessed is obtained by adding these values with the adder 62-4.

At this time, assuming that an access direction is the i-direction, the global address generating unit 34 operates as follows;

A case will be considered below where there is the following description written in, for example, FORTRAN.

$$do\ i=i1,\ i2=A(i,\ J,\ K,\ L,\ M) \qquad (i\text{-}2)$$

end do (a) Sadr_in is placed into a register 64-5. Sadr_in is a portion independent of divisional axes(j-axis, l-axis) within start addresses. When a start address of an array A(5, 10, 2, 3, 4) is specified as Atop, Sadr_in is given by the following expression.

$$Sadr\_in=Atop+(i1-1)+ni*bj*(K-1)+ni*bj*nk*bl*(M-1) \qquad (7\text{-}1)$$

(b) Sadr_exl is placed into a register 64-1. Sadr_exl is a portion dependent upon the first divisional axis(j-axis) within starts addresses, and is given by the following expression.

$$Sadr\_exl=(J-1)*ni \qquad (8\text{-}1)$$

(c) Sadr_ex2 is placed into a register 64-3. Sadr_ex2 is a portion dependent upon the second divisional axis(l-axis) and is given by the following expression.

$$Sadr\_ex2=(L-1)*ni*bj*nk \qquad (9\text{-}1)$$

(d) bexl is placed into a register 64-7. bexl represents a band width of the j-axis, i.e., a size of a consecutive area(an area having the same k value within each PE) within each PE below the j-axis in FIGS. 13 and 14, and is given by the following expression.

$$bexl=ni*bj=15 \qquad (10\text{-}1)$$

(e) bex2 is placed into a register 64-8. bex2 represents a band width of a l-axis which is the other divisional axis within two[2] groups obtained by dividing eight[8] processing elements, PE0–PE7, into two[2] groups, PE0–PE3 and PE4–PE7, a size of the consecutive areas (areas having the same m value within each PE) below l-axis which is the other divisional axis in FIGS. 13 and 14, and is given by the following expression.

$$bex2=ni*bj*nk*bl=60 \qquad (11\text{-}1)$$

(f) d_Adr_in is placed into a register 64-6. d_Adr_in represents a portion independent of an divisional axis within interval values, and is given by the following expression.

$$d\_Adr\_in=1 \qquad (12\text{-}1)$$

(g) d_Adr_exl is placed into a register 64-2. d_Adr_exl is a portion dependent upon the j-axis within interval values. In this case, since J is a fixed value, $$d\_Adr\_exl=0 \qquad (13\text{-}1)$$

is obtained.

(h) d_Adr_ex2 is placed into the register 64-2. d_Adr_ex2 is a portion dependent upon the l-axis. In this case, since L is a fixed value, $$d\_Adr\_ex2=0 \qquad (14\text{-}1)$$

is obtained.

(i) npe_exl is placed to a register 64-9. npe-exl is the number of PEs to be divided in the j-direction, and is given by the following expression.

$$npe\_exl=4 \qquad (15\text{-}1)$$

(j) leng is placed into a register 46. Since leng is a transfer length, it is given by the following expression;

$$leng=i2-i1+1 \qquad (16\text{-}1)$$

After setting as described above, the global address generating unit 34 automatically generates access addresses. Since the direction determined by a subscript ni is a direction irrelevant to an divisional axis, Adr_in only changes due to addition which does not depend on a PE number, and subsequently accesses the same PE.

When the access direction is defined to be the j-direction, the global address generating unit 34 operates as follows;

For example, a case will be discussed below where there is a following description written in, for example, FORTRAN.

$$do\ j=j1,\ j2=A(I,\ j,\ K,\ L,\ M) \qquad (j\text{-}2)$$

end do (a) Sadr_in is placed into the register 64-5. At this time, Sadr_in is given by the following expression.

$$Sadr\_in=Atop+(I-1)+ni*bj*(K-1)+ni*bj*nk*bl*(M-1) \qquad (7\text{-}2)$$

(b) Sadr_exl is placed into the register 64-1. At this time, Sadr_exl is given by the following expression;

$$Sadr\_exl=(jl-1)*ni \qquad (8\text{-}2)$$

(c) Sadr_ex2 is placed into the register 64-3. At this time, Sadr_ex2 is given by the following same expression as that represented by the expression (9-1).

$$Sadr\_ex2=(L-1)*ni*bj*nk \qquad (9\text{-}2)$$

(d) bexl is placed into the register 64-7. At this time, bexl is given by the following expression in the same manner as the expression (10-1).

$$bexl = ni*bj = 15 \qquad (10\text{-}2)$$

(e) bex2 is placed into the register 64-8. At this time, bex2 is given by the following expression in the same manner as in (11-1).

$$bex2 = ni*bj*nk*bl = 60 \qquad (11\text{-}2)$$

(f) d_Adr_in is placed into the register 64-6. At this time, since i, k, m do not change, the following relation applies.

$$d\_Adr\_in = 0 \qquad (12\text{-}2)$$

(g) d_Adr_exl is placed into the register 64-2. At this time, d_Adr_exl represents consecutive areas having a same j value within each PE, and is given by the following expression;

$$d\_Adr\_exl = ni = 5 \qquad (13\text{-}2)$$

(h) d_Adr_ex2 is placed into the register 64-2. At this time, since L is a fixed value, $$d\_Adr\_ex2 = 0 \qquad (14\text{-}2)$$

is obtained.

(i) npe_exl is placed into the register 64-9. npe_exl is given by the following expression in the same manner as in (15-1).

$$npe\_ex1 = 4 \qquad (15\text{-}2)$$

(j) leng is placed into the register 46. At this time, leng is given by the following expression.

$$leng = j2 - j1 + 1 \qquad (16\text{-}2)$$

After setting as described above, the global address generating unit 34 automatically generates access addresses. Since the direction determined by a subscript nj is the same direction as the divisional axis, Adr_exl which is related to a PE number changes due to addition. Accordingly, when a boundary between PEs is exceeded, the PE number changes and subsequently another PE is accessed.

At this time, a subtracter 61-1 obtains a value to be added (a residue value) to an in-PE address within the another PE described above, from the value of Adr_exl and outputs it to the adder 62-5. Further, the adder 62-5 generates an in-PE address of another PE.

Assuming that an access direction is a k-direction, the global address generating unit 34 operates as follows;

A case will be discussed below where there is the following description written in, for example, FORTRAN.

$$do\ k = k1,\ k2 = A(I,\ J,\ k,\ L,\ M) \qquad (k\text{-}2)$$

end do (a) Sadr_in is placed into the register 64-5. At this time, Sadr_in is given by the following expression.

$$Sadr\_in = Atop + (I-1) + ni*bj*(k1-1) + ni*bj*nk*bl*(M-1) \qquad (7\text{-}3)$$

(b) Sadr_exl is placed into the register 64-1. At this time, Sadr_exl is given by the following expression in the same manner as the expression (8-1).

$$Sadr\_exl = (j-1)*ni \qquad (8\text{-}3)$$

(c) Sadr_ex2 is placed into the register 64-3. At this time, Sadr_ex2 is given by the following expression in the same manner as the expression (9-1).

$$Sadr\_ex2 = (L-1)*ni*bj*nk \qquad (9\text{-}3)$$

(d) bexl is placed into the register 64-7. At this time, bexl is given by the following expression in the same manner as the expression (10-1).

$$bexl = ni*bj = 15 \qquad (10\text{-}3)$$

(e) bex2 is placed into the register 64-8. At this time, bex2 is given by the following expression in the same manner as that of the expression (11-1);

$$bex2 = ni*bj*nk*bl = 60 \qquad (11\text{-}3)$$

(f) d_Adr_in is placed into the register 64-6. At this time, d_Adr_in represents consecutive areas having the same k value within each PE, and is given by the following expression.

$$d\_Adr\_in = ni*bj = 15 \qquad (12\text{-}3)$$

(g) d_Adr_exl is placed into the register 64-2. At this time, since J is a fixed value, $$d\_Adr\_exl = 0 \qquad (13\text{-}3)$$

is obtained.

(h) d_Adr_ex2 is placed into the register 64-2. At this time, since L is a fixed value, $$d\_Adr\_ex2 = 0 \qquad (14\text{-}3)$$

is obtained.

(i) npe_exl is placed into the register 64-9. npe_exl is given by the following expression in the same manner as the expression (15-1).

$$npe\_exl = 4 \qquad (15\text{-}3)$$

(j) leng is placed into the register 46. At this time, leng is give by the following expression.

$$leng = k2 - k1 + 1 \qquad (16\text{-}3)$$

After setting as described above, the global address generating unit 34 automatically generates access addresses. Since the direction determined by a subscript nk is a direction irrelevant to the divisional direction, Adr_in, which is independent of a PE number, only changes due to addition, and subsequently the same PE is accessed.

Assuming that an access direction is the 1-direction, the global address generating unit 34 operates as follows;

A case will be discussed below where there is the following description written in, for example, FORTRAN.

$$do\ l = 11,\ 12 = A(I,\ J,\ K,\ l,\ M) \qquad (1\text{-}2)$$

end do (a) Sadr_in is placed into the register 64-5. At this time, Sadr_in is given by the following expression in the same manner as the expression (7-2).

$$Sadr\_ = Atop + (I-1) + ni*bj*(K-1) + ni*bj*nk*bl*(M-1) \qquad (7\text{-}4)$$

(b) Sadr_exl is placed into the register 64-1. At this time, Sadr_exl is given by the following expression in the same manner as the expression (8-1).

$$Sadr\_exl = (J-1)*ni \qquad (8\text{-}4)$$

(c) Sadr_ex2 is placed into the register 64-3. At this time, Sadr_ex2 is given by the following expression;

$$Sadr\_ex2=(l1-1)*ni*bj*nk \quad (9\text{-}4)$$

(d) A value of bexl is placed into the register 64-7. At this time, the value is given by the following expression in the same manner as the expression (10-1).

$$bexl=ni*bj=15 \quad (10\text{-}4)$$

(e) A value of bex2 is placed into the register 64-8. At this time, the value is given by the following expression in the same manner as the expression (11-1).

$$bex2=ni*bj*nk*bl=60 \quad (11\text{-}4)$$

(f) A value of d__Adr__in is placed into the register 64-6. At this time, since i, k, m do not change, $$d\_Adr\_in=0 \quad (12\text{-}4)$$

is obtained.
(g) A value of d__Adr__exl is placed into the register 64-2. In this case, since J is a fixed value, $$d\_Adr\_exl=0 \quad (13\text{-}4)$$

is obtained.
(h) A value of d__Adr__ex2 is placed into the register 64-2. At this time, d__Adr__ex2 represents the size of consecutive areas having a same 1 value and is given by the following expression.

$$d\_Adr\_ex2=ni*bj*nk=30 \quad (14\text{-}4)$$

(i) A value of npe__exl is placed into the register 64-9. npe__exl is given by the following expression in the same manner as the expression (15-1).

$$npe\_exl=4 \quad (15\text{-}4)$$

(j) A value of leng is placed into the register 46. At this time, the value of leng is given as follows;

$$leng=12-11+1 \quad (16\text{-}4)$$

After setting as described above, the global address generating unit 34 automatically generates access addresses. Since the direction determined by a subscript nl is in the divisional direction, Adr__ex2 related to a PE number changes due to addition. Subsequently, a boundary between PEs is exceeded, Adr__ex2 related to a PE number changes due to addition, and another PE is subsequently accessed.

At this time, the subtracter 61-2 obtains a value to be added to an in-PE address of another PE described above, from the value of Adr__ex2 retained in the register 64-3, and outputs it to an adder 62-5. The adder 62-5 then generates an in-PE address within this PE.

Assuming that an access direction is the m-direction, the global address generating unit 34 operates as follows;

A case will be considered below where there is the following the description written in, for example, FORTRAN.

$$do\ m=m1,\ m2=A(I,\ J,\ K,\ L,\ m) \quad (m\text{-}2)$$

end do
(a) A value of Sadr__in is placed into the register 64-5. At this time, Sadr__in is given by the following expression.

$$Sadr\_in=Atop+(I-1)+ni*bj*(K-1)+ni*bj*nk*bl*(ml-1) \quad (7\text{-}5)$$

(b) Sadr__exl is placed into the register 64-1. At this time, Sadr__exl is given by the following expression in the same manner as the expression (8-1).

$$Sadr\_exl=(J-1)*ni \quad (8\text{-}5)$$

(c) Sadr__ex2 is placed into the register 64-3. At this time, Sadr__ex2 is given by the following expression in the same manner as the expression (9-1).

$$Sadr\_ex2=(L-1)*ni*bj*nk \quad (9\text{-}5)$$

(d) A value of bexl is placed into the register 64-7. At this time, the value of bexl is given by the following expression in the same manner as the expression (10-1).

$$bex1=ni*bj=15 \quad (10\text{-}5)$$

(e) A value of bex2 is placed into the register 64-8. At this time, bex2 is given by the following expression in the same manner as the expression (11-1).

$$bex2=ni*bj*nk*bl=60 \quad (11\text{-}5)$$

(f) d__Adr__in is placed into the register 64-6. At this time, d__Adr__in represents the size of consecutive areas each having the same m value within each PE.

$$d\_Adr\_in=ni*bj*nk*bl=60 \quad (12\text{-}5)$$

(g) A value of d__Adr__exl is placed into the register 64-2. In this case, since J is a fixed value, $$d\_Adr\_exl=0 \quad (13\text{-}5)$$

is obtained.
(h) d__Adr__ex2 is placed into the register 64-2. In this case, since L is a fixed value, $$d\_Adr\_ex2=0 \quad (14\text{-}5)$$

is obtained.
(i) npe__exl is placed into the register 64-9. npe__exl is given by the following expression in the same manner as the expression (15-1).

$$npe\_exl=4 \quad (15\text{-}5)$$

(j) A value of leng is placed into the register 46. At this time, a value of leng is given by the following expression.

$$leng=m2-m1+1 \quad (16\text{-}5)$$

After setting as described above, the global address generating unit 34 automatically generates access addresses. Since the direction determined by a subscript nm is in a direction irrelevant to the divisional axis, Adr__in which does not depend upon a PE number, only changes due to addition, and the same PE is subsequently accessed.

The global address generating unit 34 shown in FIG. 12 described above is easily applicable to a case where a divisional direction of an array is defined as any two[2] of axis directions except j and l axes (for example, the case where the divisional axes are defined to be two[2] axes, i.e., i-axis and j-axis, or the like.) with manipulation required only to change a part of each expression described above.

Use of the global address generating unit shown in FIG. 12 generally enables high-speed generation of a PE number and an in-PE address in response to a division of an array in the two[2]-axis directions determined by two[2] different subscripts. However, a further limitation of how to divide an array enables a global address generating unit to be configured by a simpler circuit.

Figure 15:
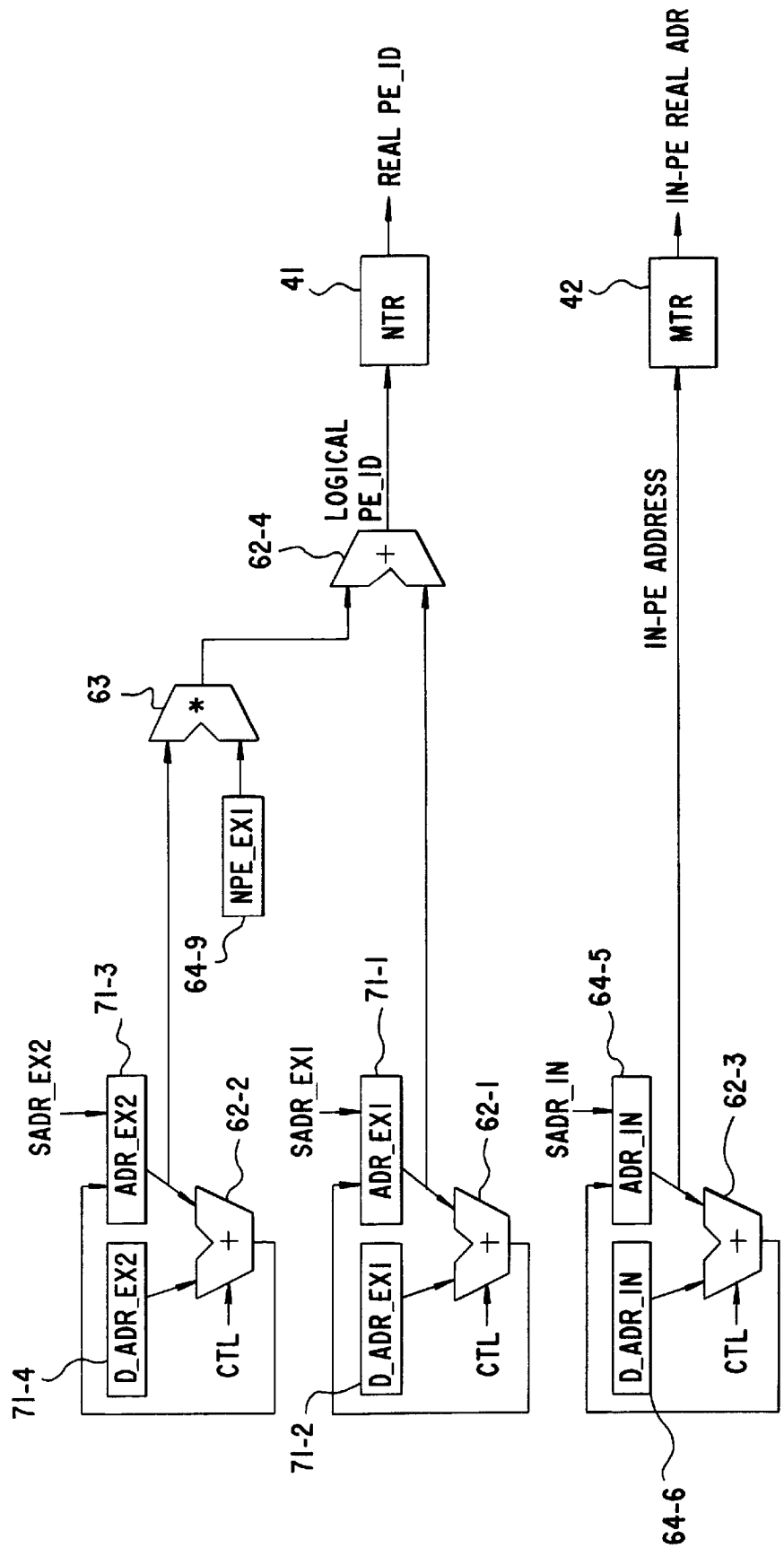
FIG. 15 is a view showing a fourth global address generating unit which corresponds to a biaxial division according to an embodiment of the present invention.

FIG. 15 shows a global address generating unit which corresponds to two[2] axis-division in a case where the number of subscripts in one[1] divisional direction equals the number of PEs in one[1] group, and the number of subscripts in the other divisional direction equals the number of PEs in one[1] group. In FIG. 15, the same elements as in FIG. 12 are assigned the same numerals or signs. Additionally, the control signal generating unit for generating a control signal ctr is configured in the same manner as shown in FIG. 12.

Registers 71-1, 71-2, 71-3, and 71-4 each functions in the same manner as those 64-1, 64-2, 64-3, and 64-4, shown in FIG. 12, but differ from those in the value retained in the respective registers. The global address generating unit shown in FIG. 15 is configured more simply so that subtracters 61-1, and 61-2, adder 62-5, and registers 64-7, and 64-8 are not provided.

In this case, a value of Adr__in is used as a logical in-PE address unchanged, and a logical PE number and a logical in-PE address are generated independently of each other.

As an example of the divisional arrangement which the global address generating unit handles, a case will be considered where an array A(5, 10, 2, 3, 4) is parallel processed by thirty[30] PEs, i.e., pe0, pe1, pe2, pe3, pe4, pe5, pe6, pe7, pe8, pe9, pe10, pe11, pe12, pe13, pe14, pe15, pe16, pe17, pe18, pe19, pe20, pe21, pe22, pe23, pe24, pe25, pe26, pe27, pe28, and pe29 in two[2] directions of the j-axis direction and the l-axis direction. In this case, an array is divided into ten[10] in the j-axis direction, and further into three[3] in the l-axis direction.

At this time,
nj=10
nl=3
npe__ex1=10
npe__ex2=3
bj=CEIL(10/10)=1
bl=CEIL(3/3)=1 are obtained, and the array A is divided as follows;

| | |
|---|---|
| pe0  | A(5, 1 : 1, 2, 1 : 1, 4) |
| pe1  | A(5, 2 : 2, 2, 1 : 1, 4) |
| pe2  | A(5, 3 : 3, 2, 1 : 1, 4) |
| pe3  | A(5, 4 : 4, 2, 1 : 1, 4) |
| pe4  | A(5, 5 : 5, 2, 1 : 1, 4) |
| pe5  | A(5, 6 : 6, 2, 1 : 1, 4) |
| pe6  | A(5, 7 : 7, 2, 1 : 1, 4) |
| pe7  | A(5, 8 : 8, 2, 1 : 1, 4) |
| pe8  | A(5, 9 : 9, 2, 1 : 1, 4) |
| pe9  | A(5, 10 : 10, 2, 1 : 1, 4) |
| pe10 | A(5, 1 : 1, 2, 2 : 2, 4) |
| pe11 | A(5, 2 : 2, 2, 2 : 2, 4) |
| pe12 | A(5, 3 : 3, 2, 2 : 2, 4) |
| pe13 | A(5, 4 : 4, 2, 2 : 2, 4) |
| pe14 | A(5, 5 : 5, 2, 2 : 2, 4) |
| pe15 | A(5, 6 : 6, 2, 2 : 2, 4) |
| pe16 | A(5, 7 : 7, 2, 2 : 2, 4) |
| pe17 | A(5, 8 : 8, 2, 2 : 2, 4) |
| pe18 | A(5, 9 : 9, 2, 2 : 2, 4) |
| pe19 | A(5, 10 : 10, 2, 2 : 2, 4) |
| pe20 | A(5, 1 : 1, 2, 3 : 3, 4) |
| pe21 | A(5, 2 : 2, 2, 3 : 3, 4) |
| pe22 | A(5, 3 : 3, 2, 3 : 3, 4) |
| pe23 | A(5, 4 : 4, 2, 3 : 3, 4) |
| pe24 | A(5, 5 : 5, 2, 3 : 3, 4) |
| pe25 | A(5, 6 : 6, 2, 3 : 3, 4) |
| pe26 | A(5, 7 : 7, 2, 3 : 3, 4) |
| pe27 | A(5, 8 : 8, 2, 3 : 3, 4) |
| pe28 | A(5, 9 : 9, 2, 3 : 3, 4) |
| pe29 | A(5, 10 : 10, 2, 3 : 3, 4) | where, for example, A(5, 1:1, 2, 1:1, 4) represents that array elements in a range of i=1, 2, 3, 4, 5, j=1, k=1, 2, l=1, m=1, 2, 3, 4 are stored.

When accessing an array A(5, 10, 2, 3, 4), each setting value for Sadr__in, d__Adr__in, leng, and npe__ex1 is the same as in the case shown in FIG. 12, except that bj=bl=1, npe=ex1=10. Each setting value for Sadr__ex1, Sadr__ex2, d__Adr__ex1, and d__Adr__ex2 differs from that shown in FIG. 12 and thus is as follows;

When an access direction is in an i-direction, a k-direction, and an m-direction, for example, in the case of a loop represented by the description (i–2), (k–2), and (m–2), each setting value is given by the following expressions.

$$Sadr\_ex1 = J-1 \tag{8-6}$$

$$Sadr\_ex2 = L-1 \tag{9-6}$$

$$d\_Adr\_ex1 = 0 \tag{13-6}$$

$$d\_Adr\_ex2 = 0 \tag{14-6}$$

When an access direction is in the j-direction and, for example, in the case of a loop represented by the description (j–2), each setting value is given by the following expressions.

$$Sadr\_ex1 = j1-1 \tag{8-7}$$

$$Sadr\_ex2 = L-1 \tag{9-7}$$

$$d\_Adr\_ex1 = 1 \tag{13-7}$$

$$d\_Adr\_ex2 = 0 \tag{14-7}$$

When an access direction is in the l-direction and, for example, in the case of a loop represented by the description (l-2), each setting value is given by the following expressions.

$$Sadr\_ex1 = J-1 \tag{8-8}$$

$$Sadr\_ex2 = l1-1 \tag{9-8}$$

$$d\_Adr\_ex1 = 0 \tag{13-8}$$

$$d\_Adr\_ex2 = 1 \tag{14-8}$$

In a division of this type, since bj=b1=1, bex1 in the expression such as (10-1) becomes ni, and bex2 in the expression such as (11-1) becomes ni*nk. Accordingly, as described above, eliminating a factor ni from the setting values of Sadr__ex1, and d__Adr__ex1 and a factor ni*nk from the setting values of Sadr__ex2 and d__Adr__ex2 can remove the necessity of subtracters 61-1, and 61-2, etc.

Figure 16:
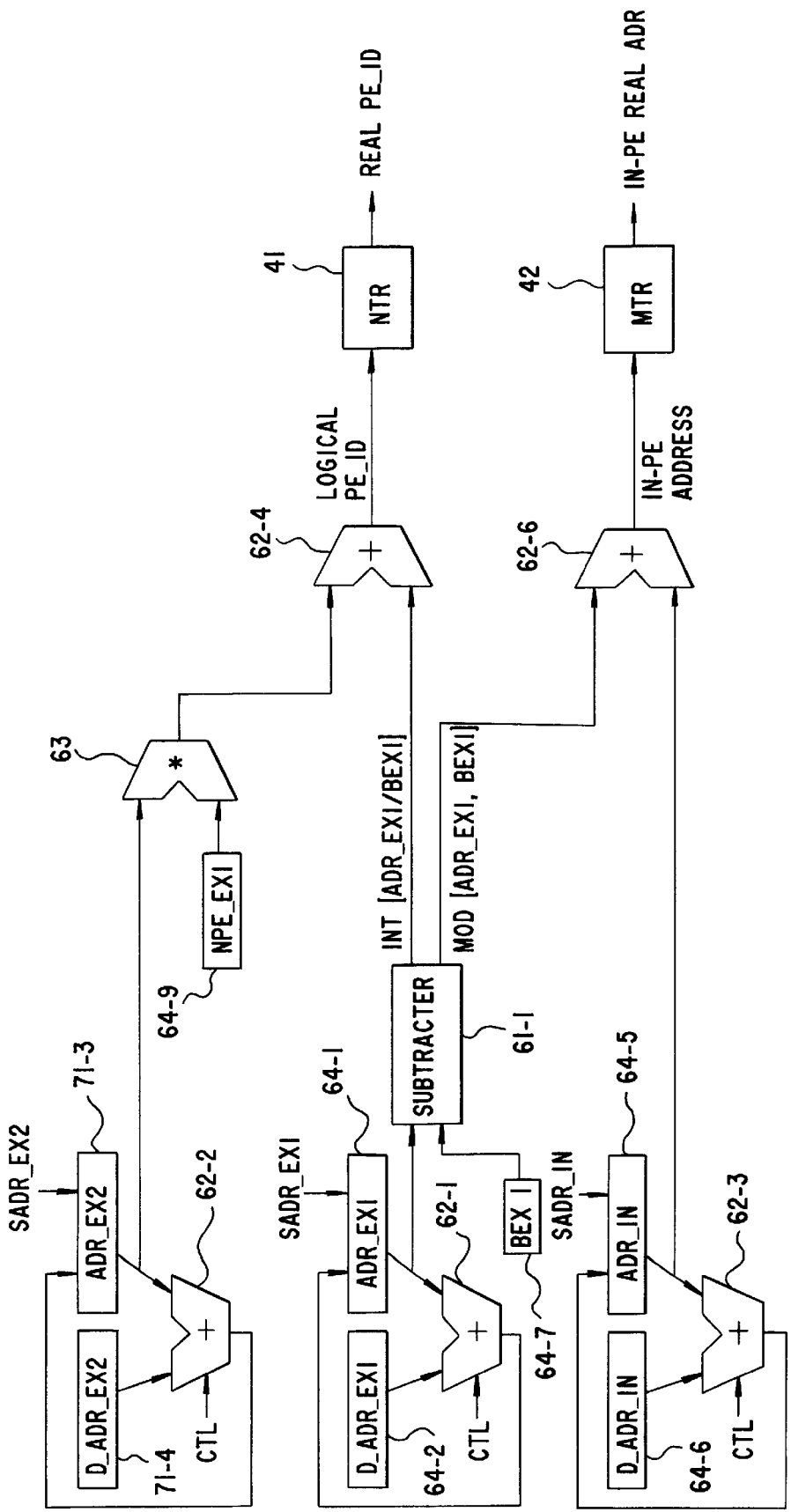
FIG. 16 is a view showing a fifth global address generating unit which corresponds to a biaxial division according to an embodiment of the present invention.

FIG. 16 shows a global address generating unit which corresponds to a two[2]-axis division in a case where the number of subscripts in one[1] divisional direction equals the number of groups of PEs, and any number of PEs per one[1] group is acceptable. In FIG. 16, the same elements as those shown in FIG. 12 are assigned the same numerals as in FIG. 12, and the same elements as those of FIG. 15 are assigned the same numerals. In addition, the configuration of a control signal generating unit for generating a control signal ctl is the same as shown in FIG. 6.

In FIG. 16, the adder 62-6 generates an in-PE address by adding Adr__in to mod[Adr__ex1, bex1] given by the subtracter 61-1 and the address register 64-5. The global address generating unit shown in FIG. 16 is not provided with the subtracter 61-2, the adder 62-5, and the register 64-8, and therefore has a simpler circuit configuration.

As an example of a divisional arrangement which the global address generating unit shown in FIG. 16 handles, a case will be considered where an array A(5, 10, 2, 3, 4) is divided by twelve[12] PEs, pe0, pe1, pe2, pe3, pe4, pe5, pe6, pe6, pe7, pe8, pe9, pe10, and pe11 in the two[2] axis directions, in the i-axis direction and the j-axis direction. In this case, an array is divided into four[4] in the j-direction and further in three[3] in the j-direction.

At this time, npe_exl=4
npe_exl=3
bj=CEIL(10/4)=3
bl=CEIL(3/3)=1 hold, and the array is divided as follows;

| | |
|---|---|
| pe0 | A(5, 1 : 3, 2, 1 : 1, 4) |
| pe1 | A(5, 4 : 6, 2, 1 : 1, 4) |
| pe2 | A(5, 7 : 9, 2, 1 : 1, 4) |
| pe3 | A(5, 10 : 12, 2, 1 : 1, 4) |
| pe4 | A(5, 1 : 3, 2, 2 : 2, 4) |
| pe5 | A(5, 4 : 6, 2, 2 : 2, 4) |
| pe6 | A(5, 7 : 9, 2, 2 : 2, 4) |
| pe7 | A(5, 10 : 12, 2, 2 : 2, 4) |
| pe8 | A(5, 1 : 3, 2, 3 : 3, 4) |
| pe9 | A(5, 4 : 6, 2, 3 : 3, 4) |
| pe10 | A(5, 7 : 9, 2, 3 : 3, 4) |
| pe11 | A(5, 10 : 12, 2, 3 : 3, 4) | where, for example, A(5, 1:3, 2, 1:1, 4) represents that array elements in a range of i=1, 2, 3, 4, and 5, j=1, 2, and 3, k=1, and 2, l=1, m=1, 2, 3, and 4 are stored.

With respect to pe3, pe7, and pe11, in order to maintain a storage area having the same size as another PE, although areas which correspond to j=11, J=12 are set, in practise these areas are not accessed.

When accessing an array A(5, 10, 2, 3, 4) of this type, each setting value for Sadr_in, Sadr_exl, d_Adr_in, d_Adr_exl, leng and npe_exl is determined in the same manner as in FIG. 12, except that bj=3, bl=1, npe_exl=4. In addition, each setting value for Sadr_ex2, and d_Adr_ex2 is determined in the same manner as in FIG. 15.

In the case of a division of this type, bex2 in the expression (11-1), etc., depends upon a variable ni*nk because of bl=1. Hence, elimination of a variable ni*nk from setting values of Sadr_ex2 and d_Adr_ex2 can remove the necessity of a subtracter 61-2, etc.

The configuration of an address generating unit and dimension and a dividing method of an array to be accessed according to the present invention is not restricted to the embodiments described above. Generally, when the number of divisional axes for an array is r, by using, for example, a global address generating unit provided with r-sets of a register for storing a start address dependent upon a divisional axis, a register for storing an increment value(an interval value) thereof, an adder for adding a start address and an increment value, a register for storing band width in the divisional-axis direction, and a divider for dividing an address in the divisional direction by the band width, an access similar to the embodiments described above is enabled.

What is claimed is:

1. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for said processing element number and said in-processing-element address and a second direction address for said in-processing-element address, wherein said global address generating means comprises:
a first register for specifying said first direction address;
a second register for specifying said second direction address;
a band width register for specifying band width within each processing element;
a first adder for adding said first direction address set in said first register and an increment of said first direction address specified by a command;
a second adder for adding said second direction address set in said second register and an increment of said second direction address specified by a command;
a first subtracter for outputting a quotient and a remainder obtained by dividing said first direction address by said band width by having said first direction address set in said first register and said band width set in said band width register as its input;
a third adder for adding said remainder and said second direction address set in said second register; and
means for outputting said remainder, said processing element number and an added result by said third adder as an in-processing-element address.

2. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for said processing element number and said in-processing-element address and a second direction address for said in-processing-element address, wherein said global address generating means comprises:
a first register for specifying said first direction address;
a second register for specifying said second direction address;

a third register for specifying an increment of said first direction address;

a band width register for specifying band width within each processing element;

a first adder for adding said first direction address set in said first register and an increment of said first direction address set in third register;

a second adder for adding said second direction address set in said second register and an increment of said second direction address specified by a command;

a first subtracter for having said first direction address set in said first register and said band width set in said band width register as its input and for outputting a quotient and a remainder obtained by dividing said first direction address by said band width;

a third adder for adding said remainder and said second direction address set in said second register;

means for outputting said remainder as said processing element number; and means for outputting an added result by said third adder as an in-processing-element address.

3. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for said processing element number and said in-processing-element address and a second direction address for said in-processing-element address, wherein said global address generating means comprises:
a first register for specifying said first direction address;
a second register for specifying said second direction address;
a third register for specifying an increment of said first direction address;
a fourth register for specifying an increment of said second direction address;
a band width register for specifying band width within each processing element;
a first adder for adding said first direction address set in said first register and an increment of said first direction address set in third register;
a second adder for adding said second direction address set in said second register and an increment of said second direction address set in fourth register;
a first subtracter for having said first direction address set in said first register and said band width set in said band width register as its input and for outputting a quotient and a remainder obtained by dividing said first direction address by said band width;
a third adder for adding said remainder and said second direction address; and
means for outputting said quotient as said processing element number and an added result by said third adder as an in-processing-element address.

4. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for said processing element number and said in-processing-element address and a second direction address for said in-processing-element address, wherein said global address generating means comprises:
a first group of registers for specifying a plurality of said first direction addresses;
a second register for specifying said second direction address;
a third group of registers for specifying an increment of said first direction address;
a fourth register for specifying an increment of said second direction address;
a group of band width registers for specifying band width each corresponding to a plurality of said first direction addresses;
a group of subtracters for having said first direction address set in said first register and said band width set in said band width register as their inputs and outputting a quotient and a remainder obtained by dividing said first direction address by said band width; and
a fourth adder for adding said remainder and said second direction address;
means for generating said processing element number by using each of said quotients; and
means for outputting an added result of said fourth adder as an in-processing-element address.

5. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second direction address;
a third register for specifying a third direction address;
a first adder for adding said first direction address set in said first register and an increment of said first direction address specified by a command;
a second adder for adding said second direction address set in said second register and an increment of said direction address specified by a command;
a third adder for adding said third direction address set in said third register and an increment of said third direction address specified by a command;
a multiplier for multiplying said first direction address set in said first register by the number of processing elements within said group;
a fourth adder for adding a result obtained by thus multiplying by said multiplier to said second direction address set in said second register and for outputting said processing number;
means for setting start addresses each corresponding to each of directions in said first register, said second register, and said third register, respectively when driven;
means for adding sequentially an increment of said first direction address, said second direction address, and said third direction address to each of said start addresses by using said first adder, said second adder, and said third adder; and
means for storing each of calculated results in said first register, said second register, and said third register.

6. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second direction address;
a third register for specifying a third direction address;
a fourth register for specifying an increment of said third direction address;
a first adder for adding said first direction address set in said first register and an increment of said first direction address specified by a command;
a second adder for adding said second direction address set in said second register and an increment of said second direction address specified by a command;
a third adder for adding said third direction address set in said third register and an increment of said third direction address specified by a command;
a multiplier for multiplying said first direction address set in said first register by the number of processing elements within said group; and
a fourth adder for adding a result obtained by thus multiplying by said multiplier to said second direction address set in said second register and for outputting a processing number;
means for setting start addresses each corresponding to each of directions in said first register, said second register, and said third register, respectively, when driven;
means for setting an increment of said third direction address in said fourth register;
means for adding sequentially an increment of said first direction address, said second direction address, and said third direction address set in said fourth register to each of said start addresses by using said first adder, said second adder, and said third adder; and
means for storing each of calculated results in said first register, said second register, and said third registers, respectively.

7. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
- a first register for specifying said first direction address;
- a second register for specifying said second direction address;
- a third register for specifying a third direction address;
- a fourth register for specifying an increment of said second direction address;
- a fifth register for specifying an increment of said third direction address;
- a first adder for adding said first direction address set in said first register and an increment of said first direction address specified by a command;
- a second adder for adding said second direction address set in said second register and an increment of said second direction address set in said fourth register;
- a third adder for adding said third direction address set in said third register and an increment of said third direction address set in said fifth register;
- a multiplier for multiplying said first direction address set in said first register by the number of processing elements within said group;
- a fourth adder for adding calculated results by thus multiplying by said multiplier to said second direction address set in said second register and for outputting said processing element number;
- means for setting start addresses each corresponding to each of directions in said first register, said second register, and said third register, respectively;
- means for setting an increment of said second direction address and said third direction address in said fourth register and said fifth register, respectively, when driven;
- means for adding sequentially an increment of said first direction address, said second direction address set in said fourth register, and said third direction address set in said fifth register to each of said start addresses by using said first adder, said second adder, and said third adder; and
- means for storing each of calculated results in said first register, said second register, and said third register respectively.

8. An apparatus for performing parallel processing by dividing data to be arranged into a plurality of processing elements having main storage units, main storage control units, and network processing units, comprising:
- means for issuing an access command capable of accessing said main storage units in said processing elements;
- local address generating means, driven by said access command, for issuing a local address for accessing said main storage units in said processing elements;
- global address generating means, driven by said access command, for issuing a global address for accessing said main storage units in said plurality of processing elements;
- processing element number generating means for generating a processing element number corresponding to a data division condition; and
- in-processing-element address generating means for generating an in-processing-element address corresponding to a data division condition,
- wherein said global address generating means generates a first direction address for a group of processing elements,
- a second direction address for the number of in-group processing elements, and
- a third direction address for said in-processing element address, wherein said global address generating means comprises:
- a first register for specifying said first direction address;
- a second register for specifying said second direction address;
- a third register for specifying a third direction address;
- a fourth register for specifying an increment of said first direction address;
- a fifth register for specifying an increment of said second direction address;
- a sixth register for specifying an increment of said third direction address;
- a first adder for adding said first direction address set in said first register and an increment of said first direction address set in said fourth register address;
- a second adder for adding said second direction address set in said second register and an increment of said second direction address set in said fifth register;
- a third adder for adding said third direction address set in said third register and an increment of said third direction address set in said sixth register;
- a multiplier for multiplying said first direction address set in said first register by the number of processing elements being present within said group;
- a fourth adder for adding a result obtained by thus multiplying by said multiplier to said second direction address set in said second register and for outputting said processing element number;
- means for setting start addresses each corresponding to each of directions in said first register, said second register, and said third register, respectively;
- means for setting an increment of said first direction address, said second direction address and said third direction address in said fourth register, and said fifth register, and said sixth register respectively, when driven;
- means for adding sequentially an increment of said first direction address set in said fourth register, said second direction address set in fifth register, and said third direction address set in said sixth register to each of said start addresses by using said first adder, said second adder, and said third adder; and
- means for storing each of the calculated results in said first register, said second register, and said third register respectively.

9. An apparatus for performing parallel processing by dividing data to be arranged into a plurality of processing elements having main storage units, main storage control units, and network processing units, comprising:
- means for issuing an access command capable of accessing said main storage units in said processing elements;
- local address generating means, driven by said access command, for issuing a local address for accessing said main storage units in said processing elements;
- global address generating means, driven by said access command, for issuing a global address for accessing said main storage units in said plurality of processing elements;
- processing element number generating means for generating a processing element number corresponding to a data division condition; and
- in-processing-element address generating means for generating an in-processing-element address corresponding to a data division condition,
- wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second register address;
a third register for specifying said third direction address;
a first adder for adding said first direction address set in said first register and n increment of said first direction address specified by a command;
a second adder for adding said second direction address set in said second register and in increment of said second direction address specified by a command;
a third adder for adding said third direction address set in said third register and an increment of said third direction address specified by a command;
a multiplier for multiplying said first direction address set in said first register by the number of processing elements being present within said group;
a subtracter for having said second direction address set in said second register and band width within each processing element as an input, and outputting a quotient and a remainder obtained by dividing said second direction address by said band width;
a fourth adder for adding results obtained by thus multiplying by said multiplier and said quotient and for outputting said processing element number;
a fifth adder for adding said third direction address and said remainder and for outputting said in-processing-element address;
means for setting start addresses each corresponding to each of directions in said first register, said second register, and said third register, respectively, when driven;
means for adding sequentially an increment of said first direction address, said second direction address, and said third direction address to each of said start addresses by using said first adder, said second adder, and said third adder; and
means for storing each of results obtained by thus adding in said first register, said second register, and said third register, respectively.

10. An apparatus for performing parallel processing by dividing data to be arranged into a plurality of processing elements having main storage units, main storage control units, and network processing units, comprising:
means for issuing an access command capable of accessing said main storage units in said processing elements;
local address generating means, driven by said access command, for issuing a local address for accessing said main storage units in said processing elements;
global address generating means, driven by said access command, for issuing a global address for accessing said main storage units in said plurality of processing elements;
processing element number generating means for generating a processing element number corresponding to a data division condition; and
in-processing-element address generating means for generating an in-processing-element address corresponding to a data division condition,
wherein said global address generating means generates a first direction address for a group of processing elements, a second direction address for the number of in-group processing elements, and a third direction address for said in-processing elements address, wherein said global address generating means comprises:
a first register for specifying said first direction address;
a second register for specifying said second register address;
a third register for specifying said third direction address;
a fourth register for specifying an increment of said third direction address;
a first adder for adding said first direction address set in said first register and an increment of said first direction address specified by a command;
a second adder for adding said second direction address set in said second register and an increment of said second direction address specified by a command;
a third adder for adding said third direction address set in said third register and an increment of said third direction address in said third register;
a multiplier for multiplying said first direction address set in said first register by the number of processing elements being present within said group;
a subtracter for having said second direction address set in said second register and band width within each processing element as an input, and outputting a quotient and a remainder obtained by dividing an address in said second direction by said band width;
a fourth adder for having the result obtained by thus multiplying by said multiplier and said quotient as an input and for outputting said processing element number;
a fifth adder for adding said third direction address and said remainder and for outputting said in-processing-element address;
means for setting each of start addresses corresponding to each of directions in said first register, said second register, and said third register, respectively when driven;
means for setting an increment of said third direction address in said fourth register;
means for adding sequentially an increment of said first direction address, said second direction address, and said third direction address set in said fourth register to each of said start addresses by using said first adder, said second adder, and said third adder; and
means for storing each of the results obtained by thus adding in said first register, said second register, and said third register, respectively.

11. An apparatus for performing parallel processing by dividing data to be arranged into a plurality of processing elements having main storage units, main storage control units, and network processing units, comprising:
means for issuing an access command capable of accessing said main storage units in said processing elements;
local address generating means, driven by said access command, for issuing a local address for accessing said main storage units in said processing elements;
global address generating means, driven by said access command, for issuing a global address for accessing said main storage units in said plurality of processing elements;
processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second register address;
a third register for specifying said third direction address;
a fourth register for specifying an increment of said second direction address;
a fifth register for specifying an increment of said third direction address;
a first adder for adding said first direction address set in said first register and an increment of said first direction address specified by a command;
a second adder for adding said second direction address set in said second register and an increment of said second direction address set in said fourth register;
a third adder for adding said third direction address set in said third register and an increment of said third direction address set in said fifth register;
a multiplier for multiplying said first direction address set in said first register by the number of processing elements being present within said group;
a subtracter for having said second direction address set in said second register and band width within each processing element as its input, and outputting a quotient and a remainder obtained by dividing said second direction address by said band width;
a fourth adder for adding the results obtained by thus multiplying by said multiplier and said quotient and for outputting said processing element number;
a fifth adder for adding said third direction address set in said third register and said remainder and for outputting said in-processing-element address;
means for setting each of start addresses corresponding to each of directions in said first register, said second register, and said third register, respectively, when driven;
means for setting an increment of said second direction address and an increment of said third direction address in said fourth register and said fifth register, respectively;
means for adding sequentially an increment of said first direction address, said second direction address set in said fourth register, an said third direction address set in said fifth register to each of said start addresses by using said first adder, said second adder, and said third adder; and
means for storing each of the results obtained by thus adding in said first register, said second register, and said third register, respectively.

12. An apparatus for performing parallel processing by dividing data to be arranged into a plurality of processing elements having main storage units, main storage control units, and network processing units, comprising:
means for issuing an access command capable of accessing said main storage units in said processing elements;
local address generating means, driven by said access command, for issuing a local address for accessing said main storage units in said processing elements;
global address generating means, driven by said access command, for issuing a global address for accessing said main storage units in said plurality of processing elements;
processing element number generating means for generating a processing element number corresponding to a data division condition; and
in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second register address;
a third register for specifying said third direction address;
a fourth register for specifying an increment of said first direction address;
a fifth register for specifying an increment of said second direction address;
a sixth register for specifying an increment of said third direction address;
a first adder for adding said first direction address set in said first register and an increment of said first direction address set in said fourth register;
a second adder for adding said second direction address set in said second register and an increment of said second direction address set in said fifth register;
a third adder for adding said third direction address set in said third register and an increment of said third direction address set in said sixth register;
a multiplier for multiplying said first direction address set in said first register by the number of processing elements being present within said group;
a subtracter for having said second direction address set in said second register and band width within each processing element as its input, and for outputting a quotient and a remainder obtained by dividing said second direction address by said band width;
a fourth adder for adding the results obtained by thus multiplying by said multiplier and said quotient and for outputting said processing element number;
a fifth adder for adding said remainder and said third direction address set in said third register and for outputting said in-processing-element address;
means for setting each of start addresses corresponding to each of directions in said first register, said second register, and said third register, respectively, when driven;
means for setting an increment of said first direction address, said second direction address and said third address in said fourth register, said fifth register, and sixth register, respectively;
means for adding sequentially an increment of said first direction address set in said fourth register, said second direction address set in said fifth register, and said third direction address set in said sixth register to each of said start addresses by using said first adder, said second adder, and said third adder; and means for storing each of the results obtained by thus adding in said first register, said second register, and said third register, respectively.

13. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second register address;
a third register for specifying said third direction address;
a first adder for adding said first direction address set in said first register and an increment of said first direction address specified by a command;
a second adder for adding said second direction set in said second register and an increment of said second direction address specified by a command;
a third adder for adding said third direction address set in said third register and an increment of said third direction address specified by a command;
a first subtracter for having said first direction address set in said first register and band width within each processing element as its input and for outputting a first quotient and a first remainder obtained by dividing said first direction address by said band width within said group;
a second subtracter for having said second direction address set in said second register and band width within each processing element as its input and for outputting a second quotient and a second remainder obtained by dividing said second direction address by said width within each processing element;
a multiplier for multiplying said first remainder by the number of processing elements being present within said group;
a fourth adder for adding the results obtained by thus multiplying by said multiplier and said quotient and for outputting said processing element number;
a fifth adder for adding said third direction address set in said third register, said first remainder, and said second remainder, and for outputting said in-processing-element address;

means for setting each of start addresses corresponding to directions in said first register, said second register, and said third register, respectively, when driven;

means for adding sequentially an increment of said first direction address, said second direction address, and said third direction address to each of said start addresses by using said first adder, said second adder, and said third adder; and means for storing each of the results obtained by thus adding in said first register, said second register, and said third register, respectively.

14. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:
a first register for specifying said first direction address;
a second register for specifying said second register address;
a third register for specifying said third direction address;
a first adder for adding said first direction address set in said first register and an increment of said first direction address specified by a command;
a second adder for adding said second direction address in said second register and an increment of said second direction address specified by a command;
a third adder for adding said third direction address set in said third register and an increment of said third direction address set in said fourth register;
a first subtracter for having said first direction address set in said first register and band width within each processing element as its input and for outputting a first quotient and a first remainder obtained by dividing said first direction address by said band width within said group;
a second subtracter for having said second direction address set in said second register and band width within each processing element as its input and for outputting a second quotient and a second remainder obtained by dividing said second direction address by said band width within each processing element;

a multiplier for multiplying said first direction address set in said first register by the number of processing elements being present within said group;

a fourth adder for adding the results obtained by thus multiplying by said multiplier and said second quotient and for outputting said processing element number;

a fifth adder for adding said third direction address set in said third register, said first remainder, and said second remainder, and for outputting said in-processing-element address;

means for setting each of start addresses corresponding to each of directions in said first register, said second register, and said third register, respectively, when driven;

means for setting an increment of said third direction address in said fourth register;

means for adding sequentially an increment of said first direction address, said second direction address, and said third direction address set in said fourth register to each of said start addresses by using said first adder, said second adder, and said third adder; and means for storing each of the results obtained by thus adding in said first register, said second register, and said third register, respectively.

15. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:

a first register for specifying said first direction address;

a second register for specifying said second register address;

a third register for specifying said third direction address;

a fourth register for specifying an increment of said second direction address;

a fifth register for specifying an increment of said third direction address;

a first adder for adding said first direction address set in said first register and an increment of said first direction address specified by a command;

a second adder for adding said second direction address set in said second register and an increment of said second direction address set in said fourth register;

a third adder for adding said third direction address set in said third register and an increment of said third direction address set in said fifth register;

a first subtracter for having said first direction address set in said first register and band width within each processing element as its input and for outputting a first quotient and a first remainder obtained by dividing said first direction address by said band width within said group;

a second subtracter for having said second direction address set in said second register and band width within each processing element as its input and for outputting a second quotient and a second remainder obtained by dividing said second direction address by said band width within each processing element;

a multiplier for multiplying said first quotient by the number of processing elements being present within said group;

a fourth adder for adding the results obtained by thus multiplying by said multiplier and said second quotient and for outputting said processing element number;

a fifth adder for adding said third direction address set in said third register, said first remainder, and said second remainder, and for outputting said in-processing-element address;

means for setting each of start addresses corresponding to each of directions in said first register, said second register, and said third register, respectively, when driven;

means for setting an increment of said second direction address and said third direction address in said fourth register and said fifth register, respectively;

means for adding sequentially an increment of said first direction address, said second direction address set in said fourth register, and said third direction address set in said fifth register to each of said start addresses by using said first adder, said second adder, and said third adder; and means for storing each of the results obtained by thus adding in said first register, said second register, and said third register, respectively.

16. An apparatus for performing parallel processing by dividing data to be arranged into a plurality of processing elements having main storage units, main storage control units, and network processing units, comprising:

means for issuing an access command capable of accessing said main storage units in said processing elements;

local address generating means, driven by said access command, for issuing a local address for accessing said main storage units in said processing elements;

global address generating means, driven by said access command, for issuing a global address for accessing said main storage units in said plurality of processing elements;

processing element number generating means for generating a processing element number corresponding to a data division condition; and in-processing-element address generating means for generating an in-processing-element address corresponding to a data division condition, wherein said global address generating means generates a first direction address for a group of processing elements, a second direction address for the number of in-group processing elements, and a third direction address for said in-processing element address, wherein said global address generating means comprises:

a first register for specifying said first direction address;

a second register for specifying said second register address;

a third register for specifying said third direction address;

a fourth register for specifying an increment of said first direction address;

a fifth register for specifying an increment of said second direction address;

a sixth register for specifying an increment of said third direction address;

a first adder for adding said first direction address set in said first register and an increment of said first direction address set in said fourth register;

a second adder for adding said second direction address set in said second register and an increment of said second direction address set in said fifth register;

a third adder for adding said third direction address set in said third register and an increment of said third direction address set in said sixth register;

a first subtracter for having said first direction address set in said first register and band width within each processing element as its input and for outputting a first quotient and a first remainder obtained by dividing said first direction address by said band width within said group;

a second subtracter for having said second direction address set in said second register and band width within each processing element as its input and for outputting a second quotient and a second remainder obtained by dividing said second direction address by said band width within each processing element;

a multiplier for multiplying said first quotient by the number of processing elements being present within said group;

a fourth adder for adding the results obtained by thus multiplying by said multiplier and said second quotient and for outputting said processing element number;

a fifth adder for adding said third direction address set in said third register, said first remainder, and said second remainder and for outputting said in-processing-element address;

means for setting each of start addresses corresponding to each of directions in said first register, said second register, and said third register, when driven;

means for setting an increment of said first direction address, said second direction address, and said third direction address in said fourth register, fifth register, and said sixth register, respectively;

means for adding sequentially an increment of said first direction address set in said fourth register, said second direction address set in said fifth register, and said third direction address set in said sixth register to each of said start addresses by said first adder, said second adder, and said third adder; and means for storing each of the results obtained by thus adding in said first register, said second register, and said third register, respectively.

* * * * *

UNITED STATES PATENT AND TRADEMARK OFFICE
CERTIFICATE OF CORRECTION

PATENT NO.:   5,835,971
DATED      :   November 10, 1998
INVENTOR(S):   Masayuki IKEDA It is certified that error appears in the above-identified patent and that said Letters Patent is hereby corrected as shown below:

IN THE TITLE PAGE:

Item [73], change "Kawasaki-ku" to --Kawasaki-shi --.

Signed and Sealed this

Seventh Day of December, 1999

Attest:

Q. TODD DICKINSON

Attesting Officer          Acting Commissioner of Patents and Trademarks